US005846660A

United States Patent [19]

Sasaki et al.

[11] Patent Number: 5,846,660

[45] Date of Patent: Dec. 8, 1998

[54] ORGANIC COMPOSITE COATED STEEL PLATE

[75] Inventors: Kenichi Sasaki; Yoshiharu Sugimoto, both of Fukuyama; Masaaki Yamashita, Yokohama, all of Japan

[73] Assignee: NKK Corporation, Japan

[21] Appl. No.: 779,324

[22] Filed: Jan. 6, 1997

[30] Foreign Application Priority Data

| | | | |
|---|---|---|---|
| Jan. 10, 1996 | [JP] | Japan | 8-002295 |
| Jan. 10, 1996 | [JP] | Japan | 8-002296 |
| Apr. 26, 1996 | [JP] | Japan | 8-106927 |
| Apr. 26, 1996 | [JP] | Japan | 8-106928 |
| Aug. 30, 1996 | [JP] | Japan | 8-230589 |
| Aug. 30, 1996 | [JP] | Japan | 8-230590 |

[51] Int. Cl.[6] .......... B32B 27/38; B21D 39/00

[52] U.S. Cl. .......... 428/413; 428/623; 428/626; 428/659

[58] Field of Search .......... 428/418, 626, 428/659, 461, 413, 623

[56] References Cited

U.S. PATENT DOCUMENTS 4,891,273 1/1990 Odashima et al. .......... 428/623

FOREIGN PATENT DOCUMENTS 0 568 084 A2 11/1993 European Pat. Off. .
0 583 769 A1 2/1994 European Pat. Off. .

OTHER PUBLICATIONS

Patent Abstracts of Japan vol. 16, No. 394 (C–0976) Aug. 1992 04 130189A Nippon Parkerizing Co. Ltd.

Patent Abstracts of Japan vol. 13, No. 327 (M–854) Jul. 1989 JP 01 110140A Sumitomo Metal Ind Ltd.

Derwent Section Ch, Week 9212 Class A82 AN 92–091228 JP 04 027 537 Jan. 1992 Kobe Steel Ltd.

Derwent SectionCh, Week 9520 Class A32, AN 95–151984 JP 07 076 783 A Mar. 1995 Nippon Steel Corp.

*Primary Examiner*—Paul J. Thibodeau
*Assistant Examiner*—Holly C. Rickman
*Attorney, Agent, or Firm*—Nixon & Vanderhye

[57] ABSTRACT

Disclosed is an organic-composite coated steel plate comprising a steel plate provided with a plated layer made of zinc or a zinc-base alloy, a chromate-treated layer formed on said plated layer with a deposition amount ranging from 1 to 200 g/m$^2$ in terms of metal chromium, and a resin film formed on said chromate-treated layer with a thickness ranging from 0.1 to 5 $\mu$m, wherein said resin film has (A) selected from the group consisting of a reaction product (I) between an ethylene-series ionomer resin and an epoxy-group containing compound, a mixture of an ethylene-series ionomer resin and an epoxy emulsion, a mixture of the reaction product (I) and an epoxy emulsion, and a mixture of the reaction product (I), an ethylene-series ionomer resin and an epoxy emulsion, in an amount of 60 to 99% by weight, and (B) fine silica particles in an amount of 1 to 40% by weight.

18 Claims, No Drawings

ORGANIC COMPOSITE COATED STEEL PLATE

BACKGROUND OF THE INVENTION

The present invention relates to an organic-composite coated steel plate comprising a steel sheet plated with zinc or a zinc-base alloy, a chromate-treated layer formed on the steel sheet, and a resin film formed on the chromate-treated layer. Such an organic-composite coated steel plate is used in household appliances or as building components.

An organic-composite coated steel plate which comprises a steel sheet plated with zinc or a zinc-base alloy (hereinafter referred to simply as a "zinc-series plated steel sheet"), a chromate-treated layer formed on the steel sheet and a resin film formed on the chromate-treated layer, has an excellent corrosion resistance and fingerprint-proofness, thereby finding a wide variety of uses in various industrial fields.

The organic-composite coated steel plate is frequently used without being painted. Not only sufficient corrosion resistance but also good appearance are required to the organic-composite coated steel plate even if it is not painted. The requirement for the corrosion resistance has been satisfied to some extent, by providing a chromatic layer and a resin film layer respectively as a lower layer and an upper layer of an organic-composite coated steel plate.

However, when the unpainted organic-composite coated steel plate is stored, particularly under high-temperature and humidity conditions, part or the entire surface of the steel plate turns black with the passage of time, causing so-called "blackening". The blackened steel plate drastically loses a commercial value from an appearance point of view. In addition to the anti-blackening property, a good paint-adhesion property is also required by the organic-composite coated steel plate since the steel plate is sometimes used after being painted. Moreover, the organic-composite coated steel plate must have a lubricating property, which protects the steel plate surface from scars in the manufacturing process including slit-processing and molding steps or during transportation, thereby rendering it resistant to the deterioration in corrosion resistance or in good appearance.

To summarize, the organic-composite coated steel plate must satisfy the requirement for any one of a good corrosion resistance, anti-blackening property, paint-adhesion property, and lubricating property.

Under these circumstances, the following two techniques have been proposed.

The technique proposed in (1) Jpn. Pat. Appln. KOKAI Publication No. 5-220445 (hereinafter referred to as "Prior Art 1"), and (2) Jpn. Pat. Appln. KOKAI Publication No. 7-52310 (hereinafter referred to as "Prior Art 2")

is one for improving the anti-blackening property of an organic-composite coated steel plate. The improvement is achieved by providing the upper layer made of a resin containing an ethylene-series ionomer resin as the base.

The other technique proposed in (3) Jpn. Pat. Appln. KOKAI Publication No. 4-61966 (hereinafter referred to as "Prior Art 3"), and (4) Jpn. Pat. Appln. KOKAI Publication No. 4-290582 (hereinafter referred to as "Prior Art 4"), is one for improving the paint-adhesion property and lubricating property of an organic-composite coated steel plate. The improvement is achieved by providing a resin containing a copolymer of ethylene and an unsaturated carboxylic acid as the base and containing a lubricant, as the upper layer.

However, there are the following problems in the prior art mentioned above.

In Prior Art 1 and 2, the anti-blackening property of the organic-composite coated steel plate can be improved by the disclosed technique. However, the steel plate thus-manufactured is still insufficient in paint-adhesion property and lubricating property.

On the other hand, in Prior Art 3 and 4, although the paint-adhesion property and lubricating property of the organic-composite coated steel plate can be improved by the disclosed technique, the steel plate thus-manufactured is still insufficient in anti-blackening property.

As is mentioned above, the organic-composite coated steel plate has not yet been provided which satisfies the requirement for any one of properties including corrosion resistance, anti-blackening property, paint-adhesion property, and lubricating property.

BRIEF SUMMARY OF THE INVENTION

An object of the present invention is to provide an organic-composite coated steel plate excellent in anti-blackening property and paint-adhesion property while retaining a good corrosion resistance.

Another object of the present invention is to provide an organic-composite coated steel plate excellent not only in anti-blackening property and paint-adhesion property but also in lubricating property, while retaining a good corrosion resistance.

The present inventors have conducted intensive studies with the view toward solving the aforementioned problems. As a result, they found that an organic-composite coated steel plate excellent not only in good anti-blackening property and paint-adhesion property but also in lubricating property while retaining a good corrosion resistance, can be obtained by forming a chromate-treated layer on the plated layer of a zinc-base metal plated steel sheet and a special resin layer on the chromate-treated layer. More specifically, they found that the anti-blackening property can be improved by providing a film on the chromate-treated layer having a thickness within a specific range. The film is characterized by having a thickness within the specific range and by comprising a reaction product (I) between an ethylene-series ionomer resin and an epoxy-group containing compound; a mixture of an ethylene-series ionomer resin and an epoxy emulsion; a mixture of the reaction produce (I) and an epoxy emulsion; or a mixture of the reaction product (I), an ethylene-series ionomer resin, and an epoxy emulsion. Besides the anti-blackening property, the paint-adhesion property can be also improved depending on the degree of the adhesiveness due to the molecular structure of the film. The present invention is accomplished based on these findings.

To be more specific, the present invention relates to a coated steel plate comprising:

a steel plate provided with a plated layer made of zinc or a zinc-base alloy;

a chromate-treated layer formed on the plated layer with a deposition amount ranging from 1 to 200 g/m$^2$ in terms of metal chromium; and a resin film formed on the chromate-treated layer with a thickness ranging from 0.1 to 5 $\mu$m, in which the resin film has (A) selected from the group consisting of a reaction product (I) between an ethylene-series ionomer resin and an epoxy-group containing compound; a mixture of an ethylene-series ionomer resin and an epoxy emulsion; a mixture of the reaction product (I) and an epoxy emulsion; and a mixture of the reaction product (I), an ethylene-series ionomer resin and an epoxy emulsion, in an amount of 60 to 99% by weight; and (B) fine silica particles in an amount of 1 to 40% by weight.

The present invention relates to an organic-composite coated steel plate comprising:

a steel plate provided with a plated layer made of zinc or a zinc-base alloy;

a chromate-treated layer formed on the plated layer of the steel with a deposition amount ranging from 1 to 200 $mg/m^2$ in terms of metal chromium; and a resin film formed on the chromate-treated layer with a thickness ranging from 0.1 to 5 $\mu$m;

in which the resin film has (A) selected from the group consisting of a reaction product (I) between an ethylene-series ionomer resin and an epoxy-group containing compound; a mixture of an ethylene-series ionomer resin and an epoxy emulsion; a mixture of the reaction product (I) and an epoxy emulsion; and a mixture of the reaction product (I), an ethylene-series ionomer resin and an epoxy emulsion, in an amount of 40 to 98% by weight;

(B) fine silica particles in an amount of 1 to 40% by weight; and an organic lubricant in an amount of 1 to 30% by weight.

(C) The ethylene-series ionomer resin contains an unsaturated carboxylic acid which is methacrylic acid.

The epoxy-group containing compound used herein is di- or poly-glycidyl ether of a polyhydric alcohol.

The reaction product (I) is contained in an amount of 0.1 to 30 parts by weight based on 100 parts of the ethylene-series ionomer resin.

The epoxy emulsion is obtained by emulsifying a high molecular epoxy resin having a molecular weight of 2000 to 5000 serving as a basic skeleton by means of covering the surface of the epoxy resin with an acrylic resin having hydrophilic property.

The ratio of the ethylene-series ionomer resin to the epoxy emulsion is 1/9 to 9/1 by weight.

The ratio of the reaction product (I) to the epoxy emulsion is 1/9 to 9/1.

As is mentioned above, according to the present invention, there is obtained an organic-composite coated steel plate excellent not only in anti-blackening property and paint-adhesion property but also lubricating property while retaining a good corrosion resistance.

DETAILED DESCRIPTION OF THE INVENTION

(Resin film)

In the present invention, a main component of the resin film provided as the upper layer is a reaction product (I) between an ethylene-series ionomer resin and an epoxy-group containing compound; a mixture of an ethylene-series ionomer resin and an epoxy emulsion; a mixture of the reaction produce (I) and an epoxy emulsion; or a mixture of the reaction product (I), an ethylene-series ionomer resin and epoxy emulsion.

(Ethylene-series ionomer resin)

The ethylene-series ionomer resin is a polymer consisting of a main chain made of a high-molecular compound primarily containing hydrocarbon and a side chain having a carboxylic group, at least one portion of which is neutralized with a metallic cation. Specific examples of the ionomer resin include a partially-neutralized co-polymer of ethylene and an unsaturated carboxylic acid. The "partially neutralized" means that at least one portion of carboxylic groups contained in the copolymer is neutralized with a metallic cation.

The unsaturated carboxylic acid used in the ethylene-unsaturated carboxylic acid copolymer is one having 3–8 carbon atoms. Specific examples of the unsaturated carboxylic acid having 3–8 carbon atoms include acrylic acid, methacrylic acid, maleic acid, fumaric acid, itaconic acid, crotonic acid, isocrotonic acid, citraconic acid, allylsuccinic acid, mesaconic acid, glutaconic acid, nadic acid (endocis-bicyclo[2,2,1]hepto-2-ene-5,6-dicarboxylic acid), methyl-nadic acid, tetrahydrophthalic acid, methylhexane hydrophthalic acid, and the like. Among them, methacrylic acid is particularly preferable.

The ethylene-unsaturated carboxylic acid copolymer serving as the main skeleton of the ethylene-series ionomer resin may contain a third component other than ethylene and an unsaturated carboxylic acid. Examples of the third component include unsaturated carboxylic acid ester such as (meta)methyl acrylate, (meta) ethyl acrylate, (meta) isopropyl acrylate; a vinyl ester such as vinyl acetate; and the like.

The content of ethylene in the ethylene-unsaturated carboxylic acid copolymer is usually 95 to 60% by weight and preferably 92 to 75% by weight. The content of the unsaturated carboxylic acid is usually 5 to 40 wt % and particularly 8 to 25 wt %. If the ethylene-unsaturated carboxylic acid copolymer contains a third component, the third component is preferably present in an amount of 40 wt % or less.

Univalent to trivalent metallic cations may be used as the metallic cation used herein. In consideration of obtaining the ionomer resin having a good emulsification property, univalent metallic cations are preferable. Among the univalent metallic cations, a sodium ion and a potassium ion are particularly preferable.

The degree of neutralization, which is a ratio of the carboxylic groups neutralized with the metallic cation to the overall carboxylic groups present in the side chain of the ethylene-unsaturated carboxylic acid copolymer, is usually 20 to 100%, and preferably 30 to 80%, in consideration of the fact that the resultant resin of water-dispersion form can be imparted with a good stability and an excellent adhesion property.

The ethylene-series ionomer resin may be formed by the following two methods. One is a method which comprises the steps of copolymerizing ethylene, an unsaturated carboxylic acid, and the third component used as necessary by means of high-pressure radical polymerization; and neutralizing the carboxylic group present in the ethylene-unsaturated carboxylic acid copolymer thus-obtained with a compound having the metallic cation mentioned above. The other one is a method which comprises the steps of subjecting polyethylene and an unsaturated carboxylic acid to the graft copolymerization; and neutralizing the carboxylic group present in the copolymer thus-obtained with the aforementioned compound having a metallic cation. In the reactions of these methods, the predetermined components may be supplied to an extruder and molten-kneaded. Alternatively, the reaction is performed in an appropriate solution.

(Epoxy-group containing compound)

In the present invention, as the epoxy-group containing compound to be reacted with the ethylene-series ionomer resin, use may be made of glycidyl esters resulting from the reaction between a carboxylic acid and 2,3-epoxypropanol and the like; and glycidyl ethers obtainable from, for example, the reaction between epichlorohydrin and a univalent or multivalent metallic alkoxide.

Examples of the carboxylic acid to be used in obtaining the glycidyl esters include saturated monocarboxylic acids such as acetic acid, propyonic acid, butyric acid, and valerianic acid; saturated dicarboxylic acids such as malonic acid, succinic acid, glutaric acid, adipic acid; aromatic carboxylic acids such as benzoic acid and phthalic acid; unsaturated monocarboxylic acids such as acrylic acid and methacrylic acid; and unsaturated dicarboxylic acids such as maleic acid, fumaric acid, itaconic acid, crotonic acid, isocrotonic acid, citraconic acid, allylsuccinic acid, mesaconic acid, glutaconic acid, nadic acid (endocis-bicyclo [2,2,1]hepto-2-ene-5,6-dicarboxylic acid), methyl nadic acid, tetrahydrophthalic acid, and methylhexahydrophthalic acid. These carboxylic acids may be contained in the glycidyl esters either alone or in the admixture with two or more members.

Specific examples of glycidyl esters to be used as the epoxy-group containing compound include diglycidyl adipate ester, diglycidyl phthalate ester, diglycidyl terephthalate ester, and the like.

The univalent or multivalent metal alkoxide for use in obtaining glycidyl ethers used as the epoxy-group containing compound is a compound resulting from the reaction between a univalent or multivalent alcohol and a metal. Examples of the univalent alcohol include methanol, ethanol, propanol, buthanol, hexanol and the like. Examples of the multivalent alcohol include ethylene glycol, resorcin, glycerine, and the like. Usable metals herein are alkaline metals or alkaline earth metals such as lithium, sodium, potassium, magnesium, and calcium.

As the univalent or multivalent metal alkoxide, sodium alkoxide and the like may be used. These metal alkoxides may be contained in glycidyl ethers, either alone or in the form of mixture of two or more members.

Examples of glycidyl ethers to be used as the epoxy-group containing compound include sorbitol polyglycidyl ether, sorbitan polyglycidyl ether, polyglycerol polyglycidyl ether, penta erythrytol polyglycidyl ether, diglycerol polyglycidyl ether, glycerol polyglycidyl ether, trimethyrolpropane polyglycidyl ether, neopentyl glycol diglycidyl ether, ethylene glycol diglycidyl ether, polyethylene glycol diglycidyl ether, tetraethylene glycol diglycidyl ether, propylene glycol diglycidyl ether, polypropylene glycol diglycidyl ether, 2,2-bis (4'-glycidyloxyphenyl)propane diglycidyl ether, and the like.

When the main component of the resin used in the upper layer is obtained, glycidyl esters and glycidyl ethers may be used either singly or in the combination form of two or more members as the epoxy-group containing compound to be reacted with the ethylene-series ionomer resin.

A particularly preferable epoxy-group containing compound is a multivalent alcohol or polyglycidyl ether since the compound reacts with a carboxyl group of the ethylene-series ionomer resin with heating, providing a film excellent in paint-adhesion.

The viscosity of the epoxy-group containing compound is preferred to be within the range of 5 to 30000 cps at 25° C., and particularly, within the range of 10 to 20000 cps.

In the present invention, it is preferable that the epoxy-group containing compound used herein should have an epoxy equivalent of 80 to 2500 g, and particularly, 120 to 2000 g. The epoxy equivalent used in the present invention refers to the amount (gram) of the epoxy-group containing compound per gram equivalent of an epoxy group. For instance, in the case where the epoxy-group containing compound having a molecular weight of 100 has one epoxy group per molecule, the epoxy equivalent of the epoxy-group containing compound is 100. In another case where the epoxy group-containing compound has two epoxy groups per molecule, the epoxy equivalent of the epoxy-group containing compound becomes 50.

(Preparation for reaction product (I) between ethylene-series ionomer resin and epoxy group containing compound)

The reaction product (I) between ethylene-series ionomer resin and epoxy group containing compound can be prepared by, for example, the following three methods.

First is a method in which the epoxy-group containing compound is dissolved in the ethylene-series ionomer resin dispersed in water. Second is a method in which an aqueous solution of the epoxy-group containing compound is added to the water-dispersion-form ethylene-series ionomer resin. Third is a method in which a mixture of the ethylene-series ionomer resin, the epoxy-group containing compound and water is prepared and melted with heat and then emulsified in its entirety.

The ethylene-series ionomer resin dispersed in water can be readily prepared. Generally, the ethylene-series ionomer resin is added to water in an amount of 1 to 60 wt % based on water, in terms of a solid matter, melted with heat at a temperature of 100° to 270° C. In this manner the ethylene-series ionomer resin is dispersed in water.

The concentrations of the ethylene-series ionomer resin and the epoxy-group containing compound in the composite resin are not particularly restricted and appropriately set depending on coating methods and apparatuses for use in coating. Generally, the amount of the ethylene-series ionomer resin and epoxy-group containing compound is adequately from 5 to 50 wt %, and preferably from 10 to 40 wt %, in total.

Furthermore, the ratio of the ethylene-series ionomer resin to the epoxy-group containing compound contained in the reaction product (I) varies depending on the molecular weight of the epoxy-group containing compound to be used, the epoxy equivalent, and the like. The content of the epoxy-group containing compound is preferably from 0.05 to 50 parts by weight based on 100 parts by weight of the ethylene-series ionomer resin, more preferably from 0.1 to 30 parts by weight, and most preferably from 0.5 to 20 parts by weight, in consideration of the fact that the composite resin layer coated on the chromate-treated layer on zinc-series plated steel sheet is obtained with an excellent waterproofness and a good adhesion property to an overlay paint.

(Epoxy emulsion)

In the present invention, the epoxy emulsion to be added to the reaction product (I) between the ethylene-series ionomer resin and an epoxy-group containing compound, may be prepared by the steps of melting a liquid epoxy resin or a solid epoxy resin with heat or dissolving it in an organic solvent, and then force-emulsifying the resultant epoxy resin in water. As the emulsion, known are epoxy-series emulsion, urethane-series emulsion, acryl-series emulsion, alkyd-series emulsion, and olefin-series emulsion, However, only epoxy emulsion contributes to a remarkable improvement of the paint-adhesion. For this reason, the present invention employs the epoxy emulsion.

As the epoxy emulsion to be added to the reaction product (I) between ethylene-series ionomer resin and the epoxy-group containing compound, for preparing the main component of the resin for use in the upper layer, particularly desired is the emulsion prepared by emulsifying a high molecular epoxy resin having a molecular weight of 2000–5000 as a basic skeleton by use of the hydrophilic property of an acrylic resin, in consideration of the fact that the resultant resin coating layer can be obtained with an excellent adhesion property to the overlay paint.

(Preparation for a mixture of ethylene-series ionomer resin and epoxy emulsion)

The mixture of the ethylene-series ionomer resin and epoxy emulsion can be prepared, for example, by dissolving the epoxy emulsion in the ethylene-series ionomer resin dispersed in water.

The ethylene-series ionomer resin is easily dispersed in water and generally prepared by adding the ethylene-series ionomer resin in an amount of 1 to 60 wt % by weight based on water in terms of a solid matter, and melting it with heat at a temperature of 100° to 270° C., thereby dispersing it.

The concentrations of the ethylene-series ionomer resin and epoxy emulsion in the composite resin are not particularly restricted and appropriately set depending on coating methods and the apparatuses for use in coating. The amount of the ethylene-series ionomer resin and the epoxy emulsion in total is 5 to 50% by weight, and preferably 10 to 40 wt %.

Furthermore, the ratio of the ethylene-series ionomer resin to the epoxy emulsion in the mixture thereof varies depending on the molecular weight of the epoxy emulsion to be used, the epoxy equivalent, and the like. The ratio of the ethylene-case ionomer resin to the epoxy emulsion is preferably 1/9 to 9/1 in terms of weight, and more preferably 2/8 to 8/2 in consideration of the fact that the resultant resin layer coated on the chromate-treated layer can be obtained with an excellent waterproofness and adhesion property to overlay paint.

(Preparation for the mixture of reaction product (I) and epoxy emulsion)

The mixture of the reaction product (I) and the epoxy emulsion is prepared by, for instance, dissolving the epoxy-group containing compound in the water-dispersed form ethylene-case ionomer resin, followed by dissolving the epoxy emulsion thereinto.

The ethylene-series ionomer resin can be easily dispersed in water by the steps of adding the ethylene-series ionomer resin to water in an amount of 1 to 60 wt % as a solid matter based on the water, and then melting the resultant mixture with heat at a temperature of 100° to 270° C.

The concentration of the mixture of the reaction product (I) and the epoxy emulsion in the composite resin is not particularly limited and appropriately prepared depending on a coating method and an apparatus used therefor. The overall amount of the reaction product (I) and the epoxy emulsion is adequately 5 to 50 wt %, and preferably 10 to 40 wt %.

In the mixture of the reaction product (I) and the epoxy emulsion, the ratio of the epoxy emulsion to the reaction product (I) varies depending on the molecular weight of the epoxy emulsion to be used, the epoxy equivalent, and the like. The ratio is preferably 1/9 to 9/1, and more preferably 2/8 to 8/2, in consideration of the fact that the resin coating layer obtained by coating the resulting composite resin on the chromate-treated layer formed on zinc-series plated steel plate, exhibits excellent waterproofness and an adhesion property to overlay paint.

(Preparation of a mixture of reaction product (I), ethylene-series ionomer resin, and epoxy emulsion)

The above-captioned mixture is prepared in the same manner as in the preparation of the mixture of the reaction product (I) and epoxy emulsion.

(Silica fine particles)

The silica fine particles to be used in the present invention are preferred to have ultrafine amorphous silica particles having a primary particle size of 5 to 50 nm and a secondary particle size of 500 nm or less. If the primary particle size exceeds 50 nm, the film will crack after drying. As a result, it is difficult to form a dense film, degrading in corrosion resistance. The silica fine particles, which have a silanol-group on the surface, are classified into the following three types depending on the supply forms to the market. Any one of the three types can be applied to the present invention.

(1) Silica fine powder

The silica fine powder, which is generally-called dry silica, have a primary particle size of 50 nm or less. The silica fine powder is formed by combustion of silicon tetrachloride. The silica fine powder is used in a water-dispersion form or in an organic-solvent dispersion form.

(2) Silica dispersed in organic solvent

The silica dispersed in an organic solvent is generally called "organo silica-sol". As an example of the organo silica-sol, there is the silica prepared by a method described in U.S. Pat. No. 2,285,449.

(3) Water-dispersion form silica

The silica dispersed in water is a so-called colloidal silica having a primary particle size of 5 to 50 nm. The colloidal silica is produced by removing sodium from water glass by means of ion-exchange, acidic decomposition, peptization, or the like and generally supplied in a water-dispersion form.

In the present invention, the silica fine particles should be contained in the composite resin, which is a main component of the resin film, in an amount of 1 to 40 wt % in consideration of corrosion resistance and film-fragility. If the content of the silica fine particles is less than 1 wt %, the corrosion resistance decreases. On the other hand, in excess of 40 wt %, the film will become fragile, having no improvement in the corrosion resistance. In addition, the resin solution becomes too viscous to be coated, rendering the formation of the resultant film incomplete. Consequently, the corrosion resistance and anti-blackening property as well as paint-adhesion property of the film degrade.

In the present invention, silica can be used together with a chromium compound such as a chromate compound. The silica and the chromium compound may be used in a total amount within the range of 50 wt % or less. As the chromium compound, use may be made of sexivalent chromate compounds and chromium chromate compounds such as chromic acid anhydride ($CrO_3$), strontium chromate ($SrCrO_4$), barium chromate ($BaCrO_4$), lead chromate ($PbCrO_4$), and basic zinc chromate ($ZnCrO_4 \cdot 4Zn(OH)_2$).

(Organic lubricant)

In the present invention, to impart lubricating property to the resin film, an organic lubricant may be added to the aforementioned composite resin composition, as an essential component. As the organic lubricant, use may be made of a fine resin powder having an average particle size of 20 μm or less. For example, a polyolefin series resin powder is effective for the lubricant. Any of the polyolefin series resin powder may be used as long as it is a copolymer based on an olefin-series hydrocarbon such as polyethylene, polypropylene, or polybuthan. These copolymers may be used singly or in the combination form. In view of quality, the polyolefin-series resin powder is preferred to have a weight-average molecular weight of 500 to 5000. If the average molecular weight exceeds 5000, the lubricating property tends to degrade. If the average weight is less than 500, the surface of the resin film becomes sticky, causing unfavorable blocking during the storage in the form of a coil. Other than the polyolefin-series resin powder, fine powders made of fluorine-series resin such as poly-4 ethylene fluoride resin, poly-6 propylene fluoride resin, or polyvinylidene resin, may be used. These fine powders may be used in combination with the polyolefin series resin powder.

It is considered that an inorganic solid type lubricating agent such as graphite or molybdenum disulfide may be used in place of the organic lubricant. However, it is not preferable to use the inorganic solid type lubricating agent since the compatibility of the inorganic lubricating agent with a resin solution is insufficient, thereby rendering the storage stability poor and reducing the lubricating property after the film is formed.

The addition amount of the organic lubricant falls within the range of 1 to 30 wt % based on the composite resin, which is a main component of the resin film. If the organic lubricant is less than 1 wt %, the lubrication property cannot be fully exhibited. In excess of 30 wt %, the strength of the resin film is likely to decrease, reducing the paint-adhesion. The more preferable range of the organic lubricant to be added is 2 to 15 wt %. If the organic lubricating agent is contained in an amount of 2 wt % or more, the resultant resin film will be excellent particularly in lubricating property. If contained in an amount of 15 wt % or-less, the paint-adhesion property is particularly good.

(Content of each component)

Since the content of the silica particles is 1 to 40 wt %, the resin film contains a reaction product (I) between an ethylene-series ionomer resin and an epoxy-group containing compound; a mixture of an ethylene-series ionomer resin and an epoxy emulsion; a mixture of the reaction produce (I) and an epoxy emulsion; or a mixture of the reaction product (I), an ethylene-series ionomer resin, or an epoxy emulsion, in an amount of 60 to 99 wt % in the case where no organic lubricant is added.

In the case where an organic lubricant is added, the overall amount of the silica particles and the organic lubricant contained in the resin film must be 60 wt % or less. This is because if this amount exceeds 60 wt %, the adhesion property of the resin to the underlying layer will degrade, reducing the anti-blackening property. Furthermore, the adhesion property to the overlay paint will be also lowered.

Since such a limitation is present with respect to the contents of the silica particles and the organic lubricant when the organic lubricant is added, the resin film must contain 40 to 98 wt % of a reaction product (I) between an ethylene-series ionomer resin and an epoxy-group containing compound; a mixture of an ethylene-series ionomer resin and an epoxy emulsion; a mixture of the reaction produce (I) and an epoxy emulsion; or a mixture of the reaction product (I), an ethylene-series ionomer resin, and an epoxy emulsion.

(Resin film)

In the present invention, the thickness of the resin film is 0.1 to 5 $\mu$n, and preferably 0.3 to 3 $\mu$m. The resin film having a thickness of less than 0.1 $\mu$m, is not preferable not only because the barrier effect for suppressing the blackening, cannot be expected, but also because the resin film cannot be protected from scars during handling. On the other hand, the resin film having a thickness exceeding 5 $\mu$m is not preferable since the resin film becomes easily removed at the time the film is processed under severe conditions.

To the resin film used in the present invention, if necessary, a metal oxide, pigments, dyes, other additives for imparting various properties may be added.

The composite resin film is formed by, for example, either of the following two methods. One is a method in which a coating solution composition containing the composite resin mentioned above as a main component is coated by means of a known coating means such as a roll coater, curtain roll coater, or spray. The other is a method in which the zinc-series plated steel sheet treated with a chromate, is soaked in the coating solution and dried while the deposition amount is being controlled by means of a roll or air-spray, thereby forming a film. The composite resin film may be dried at normal temperature, but generally dried by heating to approximately 60° C. or more, preferably to 80° to 200° C. by means of a hot-air oven or an induction heating apparatus.

(Zinc-series plated steel plate)

The zinc-series plated steel sheet to be used in the present invention include electrically galvanized steel sheet which is susceptible for blackening, other zinc-series plated steel sheet and zinc-base alloy plated steel sheet made by an electroplating method or a hot-dip plating method.

(Chromate-treated layer)

The chromate-treated layer imparts an excellent corrosion resistance to the steel plate and making the formation of the resin film easier. The chromate layer may be formed by known chromate treatment such as reactive-type, coating-type, or electlytic-type. The deposition amount of the chromate layer must be 1 to 200 mg/m$^2$ in terms of metal chromium. If the deposition amount is less than 1 mg/m$^2$, the corrosion resistance is insufficient. In excess of 200 mg/m$^2$, improvement in corrosion resistance corresponding to the deposition amount cannot be obtained. Besides this, cohesive failure of the chromate layer is likely to occur associated with a configurational change caused by bending the steel plate. A preferable deposition amount of the chromate-treated layer is within the range of 10 to 100 mg/m$^2$ per surface of the steel plate in terms of metal chromium.

The reactive-type chromate treatment solution, for example, contains a water-soluble chromium compound in an amount of 1 to 100 g/l in terms of metal chromium and sulfuric acid in an amount of 0.2 to 20 g/l as main components. Trivalent chromium is contained in an amount of 50 wt % or less and preferably 20 to 35 wt % or less based on the amount of the overall chromium. If necessary, the chromate treatment solution may contain an appropriate amount of a metal ion such as $Zn^{2+}$, $Co^{2+}$, or $Fe^{3+}$, and a mineral acid such as phosphoric acid or hydrofluoric acid.

The coating-type chromate treatment solution is prepared by adding an organic high-molecular resin to the solution having the same composition as that of the reactive-type chromate treatment solution, followed by adjusting the pH to 2.0 to 3.5. The organic high molecular resin is characterized by a water-soluble resin having plenty of carboxylic groups in the molecule and having compatibility with the solution having the same composition as that of the reactive-type chromate treatment solution. It is preferable that the organic high-molecule resin have an average molecular weight of 1000 to 500,000. The addition amount of the organic high-molecule resin is generally 0.02 to 30 g/l in terms of resin.

In either case, the deposition amount of the chromate layer may fall within the range of 1 to 200 mg/$m^2$ in terms of metal chromium.

EXAMPLES

Hereinbelow, the examples of the present invention will be explained in comparison with Comparative Examples. In the following explanation, "part" and "%" are indicated based on weight.

In the tables shown below, the symbols listed in the column "Ethylene-series ionomer resin" refer to the following polymers:

A: Ethylene-methacrylic acid copolymer, Na-neutralized ionomer (a resin described in Synthesis Example)

B: Ethylene-acrylic acid copolymer, Na-neutralized ionomer

C: Ethylene-fumaric acid copolymer, Na-neutralized ionomer

D: Ethylene-itaconic acrylic acid copolymer, Na-neutralized ionomer

E: Ethylene-maleic acid copolymer Na-neutralized ionomer

F: Ethylene-acrylic acid copolymer

G: Acrylic resin emulsion

H: Water-soluble urethane resin

I: Vinyl acetate-acrylic acid copolymer

J: Ethylene-vinyl acetate copolymer

In the tables shown below, the symbols listed in the column "Epoxy-group containing compound" refer to the following compounds:

a: Tetraethylene glycol diglycidyl ether b: 2,2-bis(4'-glycidyloxyphenyl)propane glycidyl ether c: Adipic acid diglycidyl ester d: Phthalic acid diglycidyl ester In the tables shown below, the symbols listed in the column "Epoxy emulsion" refer to the following emulsions:

aa: Epoxy emulsion having an epoxy skeleton of 3500 molecular weight bb: Epoxy emulsion having an epoxy skeleton of 4500 molecular weight cc: Epoxy emulsion having an epoxy skeleton of 3000 molecular weight dd: Epoxy emulsion having an epoxy skeleton of 2000 molecular weight Anti-blackening property, corrosion resistance, paint adhesion and lubricating property shown in tables listed in a later part were evaluated by the tests described below:

(1) Anti-blackening property

Organic-composite steel plates were allowed to stand in high temperature and humid conditions (50° C., 95% RH), for 60 days. The anti-blackening property of the steel plates was determined on the basis of difference in the L-value {JIS Z8730, 6.6.2 (1980), } brightness index based on the Hunter color-difference formula). The standard for evaluation is as follows:

Difference in L value

◎: 1 or less

○: 1–3

Δ: 3–5 x: More than 5

(2) Corrosion resistance

The salt spray test based on JIS Z2371 was performed and the area of white-rust observed at 240 hours after the test was determined by percentage. The corrosion resistance was evaluated according to the following standard.

Ratio (%) of white-rust area

◎: 10% or less

○: 10% or more and less than 30%

Δ: 30% or more and less than 50% x: 50% or more (3) Paint-adhesion

Melamine alkyd series paint (manufactured by Dainippon Paint: Delicon #700)

The paint was coated on a sample substrate by means of spray in a thickness of 30 μm. The resultant sample substrate was baked for 30 minutes at 130° C. to prepare a test piece. After soaked in boiling-water for 30 minutes, the test piece was cut into 100 lattice patterns of 1 $mm^2$ according to lattice pattern taping method (JIS K5400 8. 5. 2). The paint adhesion property was evaluated by the area (%) of lattice pieces removed by tape. The evaluation scores are as follows:

Removed area (%)

◎: None

○: less than 10%

Δ: 10% or more and less than 50% x: 50% or more

The same tests were performed with respect to polyester series powder paint, epoxy series powder paint, acrylic series paint, and urethane series paint, in the same manner as in the melamine alkyd series paint. The same evaluations were performed as in melamine alkyd series paint.

The ink-adhesion property to epoxy series ink

Epoxy-series screen ink (manufactured by Seiko Advance, #1000) was coated on a sample substrate by silk-printing in a thickness of 10 μm. The resultant sample substrate was baked for 40 minutes at 120° C. In this manner, the test sample was obtained and evaluated in the same manner as in melamine alkyd series paint.

(4) Lubricating property

The lubricating property was evaluated by means of a tension tester. Flat-plate test piece was pulled at a surface pressure of 50 kg/$cm^2$ and a pull rate of 100 m/min. The kinetic coefficient of friction was checked at this point for each test piece. The evaluation was made according to the following standard.

Kinetic coefficient of friction

◎: less than 0.10

○: 0.10 - less than 0.15

Δ: 0.15 - less than 0.25 x: 0.25 or more (Synthesis Example 1 for composite resin)

First, we will describe a method of synthesizing a base resin made of an ethylene-series ionomer resin and an epoxy-group containing compound. The ethylene-methacrylic acid copolymer (100 g) partially neutralized with sodium hydroxide (methacrylic acid content: 15%, neutralization degree: 50%) was melted at 250° C., to prepare a molten product of an ethylene-series ionomer resin.

The molten product of an ethylene-series ionomer resin was added to water (300 g). The resultant mixture was charged into a pressure-resistant homomixer (an inner volume of 1l) heated to 170° C. for about 2 hours while stirring at 1000 rpm. The mixture was then cooled to room temperature with stirring for a further 30 minutes. In this manner, the ethylene-series ionomer resin was dispersed into water in a concentration of 25%. The resultant water-dispersion-form ethylene-series ionomer resin had a viscosity of 600 cps (25° C.) and an average particle size of 1 μm or less.

Next, an aqueous solution (50%) of tetraethylene glycol diglycidyl ether was prepared and added to the water-dispersion-form ethylene-series ionomer resin (100 g) in an amount of 5.0 g. The resultant mixture was stirred sufficiently to obtain water-dispersed type resin solution A.

Other resin solutions different in copolymer, epoxy-group containing compound, and content were synthesized basically in the same manner and conditions.

In addition, resins different in base resin for use in Comparative Examples were synthesized in the similar manner. The resins are listed in Table 1 described later in the specification.

Composite resin compositions were obtained by adding silica fine particles and an organic lubricant to these resins. The following is an example of the composite resin preparation.

Resin A (100 parts) was charged in a flask. To this, gradually added were 3.4 g of fumed silica (manufactured by Nippon Aerosil, commercially available under a trade name "Aerosil 300", a primary particle size: 7 nm) and 3.4 g of a polyethylene fine powder (particle size: 0.6 μm) having a molecular weight of 2000 as the organic lubricant while stirring sufficiently at normal temperature for approximately 10 minutes.

Examples 1–1 to 1–29

The reactive-type chromate treatment or coating-type chromate treatment was applied to the plated layer of an electrically galvanized steel plate having a thickness of 0.8 mm and a deposition amount of 20 g/m$^2$. The resultant steel plate was dried, forming a chromate treated layer with a deposition amount of 10 to 200 mg/m$^2$.

On the chromate treated layer, each of the various composite resin compositions synthesized in Synthesis Example 1, was coated by means of a roll coater. Thereafter, the coating solution was dried by heating by use of an induction heating apparatus until the temperature of the steel plate reached 140° C. In this manner, each of resin films was formed. Conditions of individual Examples are shown in Table 1.

Comparative Examples 1–1 to 1–18

In the Comparative Examples, a chromate treated layer with a deposition amount of 25 mg/m$^2$ was formed on the plated layer of the same electrically galvanized steel plate as used in Examples by the reactive-type chromate treatment. On the chromate-treated layer, each of various resin films out of the scope of the present invention was formed under the conditions shown in Table 1.

In the meantime, the chromate deposition amounts listed in Table 1 are indicated in terms of a metal chromium amount. The contents of the epoxy-group containing compound are indicated by parts by weight based on 100 parts by weight of the ethylene-series ionomer resin. The contents of silica and organic lubricant in the resin films are indicated by percentages based on the total amount (100%) of the resin, silica, and organic lubricant.

As is apparent from Table 1, any one of the resin films of Examples 1–1 to 1–29 (Examples 1 to 29 in Table 1) exhibits excellent anti-blackening property, corrosion resistance, paint-adhesion, and lubricating property. Among them, the anti-blackening property is particularly excellent in the resin films of Examples 1–1 to 1–18 in which the ethylene-methacrylic acid copolymer and Na-neutralized ionomer are used as a bass resin. The resin films (Examples 1–1 to 6, 8, 9, 11, 13, 14, 18, and 19), which contain the epoxy-group containing compound consisting of diglycidyl ether or polyglycidyl ether of polyhydric alcohol in an amount of 0.5 to 20 parts based on 100 parts of the ethylene-series ionomer resin and further contain the organic lubricant in an amount of 2 to 15%, are particularly excellent in all properties including anti-blackening property, corrosion resistance, paint-adhesion, and lubricant property.

In contrast, as is apparent from Table 1, the resin films of Comparative Examples 1–1 to 1–18 (Comparative Examples 1 to 18 in Table 1) fail to satisfy all properties including anti-blackening property, corrosion resistance, paint adhesion, and lubricating property. To describe more specifically, the resin films of Comparative Examples 1–1 and 1–2 are inferior in corrosion resistance since the content of the epoxy-group containing compound (1 to 30 parts based on 100% of the ethylene-series ionomer resin) is out of the scope of the present invention. The corrosion resistances of the resin films of Comparative Examples 1–3 and 1–4 are also poor because the silica contents thereof are out of the present invention. In Comparative Example 1–5, since the thickness of the resin film is lower than the lowermost limit, the corrosion resistance of the resin film is low. In Comparative Example 1–6, since the thickness of the resin film is larger than the uppermost limit, the film is inferior in anti-blackening property. The film of Comparative Example 1–7 is inferior in lubricating property since the content of the organic lubricant is lower than the lowermost limit. Conversely, since the content of the organic lubricant is larger than the uppermost limit, the paint-adhesion is poor. Moreover, the resin films of Comparative Examples 1–9 to 1–18 are insufficient in anti-blackening property, corrosion resistance, and paint-adhesion since the employed resins differ.

Examples 2–1 to 2–22

Base resins (Reaction product I between an ethylene-series ionomer resin and an epoxy-group containing compound) were synthesized in the same manner as in Example 1. To each of the base resins thus obtained, silica fine particles (but not organic lubricant) were added, thereby obtaining composite resin compositions. The following is an example of the composite resin preparation.

Resin A (100 parts) was charged in a flask. While the resin A was sufficiently stirred at room temperature, 3.2 g of fumed silica (manufactured by Nippon Aerosil, commercially available under a trade name "Aerosil 300", a primary particle size: 7 nm) was added, while sufficiently stirring at normal temperature for about 10 minutes.

Next, the reactive-type chromate treatment or coating-type chromate treatment was applied to the plated layer of an electrically galvanized steel plate of 0.8 mm thick with a deposition amount of 20 g/$m^2$. The resultant steel plate was dried, thereby forming a chromate treated layer in a deposition amount of 10 to 200 mg/$m^2$.

On the chromate treated layer, each of various composite resin compositions synthesized in the Synthesis Example 1 was coated by means of a roll coater. Thereafter, the coating solution was dried by heating by use of an induction heating apparatus until the temperature of the steel plate reached 140° C. In this manner, the resin film was formed. Conditions of individual Examples are shown in Table 2.

Comparative Examples 2–1 to 2–16

Resins used in Comparative Examples 2 having different bases were synthesized in the same manner.

In Comparative Example 2, a chromate treated layer was formed on the plated layer of an electrically galvanized steel plate in a deposition amount of 25 mg/$m^2$ by the reactive-type chromate treatment. On the resultant chromate-treated layer, each of various resin films was formed under the conditions shown in Table 2.

The chromate deposition amounts listed in Table 2 are indicated in terms of the amount of metal chromium. The contents of the epoxy-group containing compound are indicated in terms of parts by weight based on 100 parts by weight of the ethylene-series ionomer resin. The silica contents in the resin films are expressed by percentages based on 100% of the total amount of resin and silica.

Organic-composite coated steel plates of Example 2 and Comparative Example 2 were tested for anti-blackening property, corrosion resistance, and paint-adhesion. The results are also shown in Table 2.

As is evident from Table 2, any of the resin films of Examples 2–1 to 2–22 (Examples 1 to 22 in Table 2) is excellent in anti-blackening property, corrosion resistance, and paint-adhesion. Among them, the anti-blackening property is particularly excellent in the films of Examples 2–1 and 2–14 which use the ethylene-methacryl acid copolymer and Na-neutralized ionomer as a base resin. On the other hand, particularly excellent paint-adhesion is seen in the resin films of Examples 2–1 to 2–8, 11, and 12 in which diglycidyl ether or polyglycidyl ether of a polyhyrdric alcohol is used as the epoxy-group containing compound in an amount of 0.5 to 20 parts by weight based on 100 parts by weight of ethylene-series ionomer resin.

In contrast, in Comparative Examples 2–1 to 2–16 (Comparative Examples 1 to 16 in Table 2), there are no resins satisfying all of the properties: anti-blackening property, corrosion resistance, and paint-adhesion, as is apparent from Table 2. To be more specific, the resin films of Comparative Examples 2–1 and 2–2, are poor in the corrosion resistance since the contents of the epoxy-group containing compound (1 to 30 parts by weight based on 100 parts by weight of the ethylene-series ionomer resin) are out of the scope of the present invention. The corrosion resistances of Comparative Examples 2–3 and 2–4 are low since the silica contents are out of the scope of the present invention. The resin film of Comparative Examples 2–5 is also inferior in corrosion resistance since the thickness of the resin film is smaller than the lowermost limit. Conversely, in Comparative Example 2–6, since the resin film has a thickness larger than the upper limit, the anti-blackening property is low. In Comparative Examples 2–7 to 2–16, the resin films are insufficient in anti-blackening property, corrosion resistance, and paint-adhesion because the employed resins differ.

(Synthesis Example 2 for composite resin)

At first, we will start from a method of synthesizing a base resin which is a mixture of the ethylene-series ionomer resin and the epoxy emulsion. The ethylene-methacryl acid copolymer (100 g) partially neutralized with sodium hydroxide (methacrylic acid content: 15%, neutralization degree: 50%) was melted at 250° C. to prepare a molten product of an ethylene-series ionomer resin.

The molten product of an ethylene-series ionomer resin was added to water (300 g). The resultant mixture was charged into a pressure-resistant homomixer (an inner volume of 1l) heated to 170° C. for about 2 hours while stirring at 1000 rpm. The mixture was then cooled to room temperature with stirring for a further 30 minutes. In this manner, the ethylene-series ionomer resin was dispersed into water in a concentra- tion of 25%. The resultant water-dispersion-form ethylene-series ionomer resin had a viscosity of 600 cps (25° C.) and an average particle size of 1 μm or less.

Next, an aqueous solution of the epoxy emulsion (40% by weight) having an epoxy skeleton with a molecular weight of 3500, was prepared. The aqueous solution (62.5 g) was added to the water-dispersion-form ethylene-series ionomer resin (100 g) and then, stirred. In this way, water-dispersion-form resin solution A was obtained.

Other resin solutions different in copolymer, epoxy emulsion, and ratio of ethylene-series ionomer resin/epoxy emulsion, were synthesized basically in the same manner and conditions.

The resins having different base resins for use in Comparative Examples were synthesized in the same manner. The resins are shown in Table 3 described later in the specification.

To the resins thus obtained, silica fine particles were added, to obtain composite resin compositions. The following is an example for the preparation of composite resin compositions:

Resin A (100 parts) was charged in a flask. To this, gradually added were 3.4 g of fumed silica (manufactured by Nippon Aerosil, commercially available under a trade name “Aerosil 300”, a primary particle size: 7 nm) and 3.4 g of a polyethylene fine powder (particle size: 0.6 μm) having a molecular weight of 2000 as the organic lubricant, while stirring sufficiently at normal temperature for about 10 minutes. In this manner, the composite resin composition was obtained.

Examples 3–1 to 3–29

The reactive-type chromate treatment or coating-type chromate treatment was applied to the plated layer of an electrically galvanized steel sheet of 0.8 mm thick with a deposition amount of 20 g/$m^2$. The resultant steel plate was dried, thereby forming a chromate treated layer with a deposition amount of 10 to 200 mg/$m^2$.

On the chromate treated layer, each of various composite resin compositions synthesized in the Synthesis Example 2 was coated by means of a roll coater. Thereafter, each of the coated solutions was dried by heating by use of an induction heating apparatus until the temperature of the steel plate reached 140° C. In this manner, each of the resin films was formed. Conditions of individual Examples are shown in Table 3.

Comparative Examples 3–1 to 3–18

In the Comparative Examples, a chromate treated layer was formed on the plated layer of the electrically galvanized steel plate which was the same as that used in Examples, in a deposition amount of 25 mg/$m^2$ by the reactive-type chromate treatment. On the chromate-treated layer, each of various resin films out of the scope of the present invention was formed under the conditions shown in Table 3.

The chromate deposition amounts shown in Table 3 are indicated in terms of a metal chromium amount. The ratio of the epoxy emulsion is expressed in terms of the weight ratio of ethylene-series ionomer resin/epoxy emulsion. The contents of silica and organic lubricant in the resin film are expressed by percentages based on the total amount (100%) of the resin, silica, and organic lubricant.

The organic-composite coated steel plates of Examples and Comparative Examples thus obtained were tested for anti-blackening property, corrosion resistance, paint-adhesion and lubricating property. The results are also shown in Table 3.

As is evident from Table 3, any of the resin films of Examples 3–1 to 3–29 (Examples 1 to 29 in Table 3) is excellent in anti-blackening property, corrosion resistance, paint-adhesion, and lubricating property. Among them, the anti-blackening property is particularly excellent in Examples 3–1 and 3–18 which uses the ethylene-methacryl acid copolymer and Na-neutralized ionomer as a base resin. Furthermore, any one of anti-blackening property, corrosion resistance, paint adhesion and lubricating property is particularly excellent in Examples 3–1 to 6, 8, 9, 11, 13, 14, 18 and 19 which contain the ethylene-series ionomer resin and epoxy emulsion in a weight ratio of 1/9 to 9/1 and further contains the organic lubricant in an amount of 2 to 15 wt %.

In contrast, in Comparative Examples 3–1 to 3–18 (Comparative Examples 1 to 18 in Table 3), there are no resins satisfying simultaneously all of the properties: anti-blackening property, corrosion resistance, paint-adhesion, and lubricating property, as is apparent from Table 3. To be more specific, in the resin of Comparative Example 3–1, the paint adhesion is poor since the resin contains no epoxy emulsion. In Comparative Example 3–2, since the resin is made of the epoxy emulsion alone, it is poor in the anti-blackening property and corrosion resistance. The Comparative Examples 3—3 and 3–4 are inferior in corrosion resistance since the silica contents are out of the scope of the present invention. The resin film of Comparative Example 3–5 is inferior in corrosion resistance since the film thickness is smaller than the lowermost limit. On the other hand, the resin of Comparative Example 3–6 is poor in anti-blackening property since the film thickness is larger than the uppermost limit. Since the resin film of Comparative Example 3–7 contains the organic lubricant lower than the lowermost limit, the lubricating property is low. On the contrary, the resin film of Comparative Example 3–8 contains the organic lubricant larger than the uppermost limit, the paint-adhesion is poor. In Comparative Examples 3–9 to 3–18, the resin films are insufficient in anti-blackening property, corrosion resistance, and paint-adhesion because the employed resins differ.

Examples 4–1 to 4–22

Composite resin compositions were obtained in the same manner as in Example 3. That is, the base resin (a mixture of the ethylene-series ionomer resin and epoxy emulsion) was synthesized. To the resultant resin, silica fine particles (excluding the organic lubricant) were added. The following is one of examples for the preparation of the composite resin compositions:

Resin A (100 parts) was charged in a flask. To this, gradually added were 3.2 g of fumed silica (manufactured by Nippon Aerosil, commercially available under a trade name "Aerosil 300", a primary particle size: 7 nm) while stirring sufficiently at normal temperature for about 10 minutes. In this manner, the composite resin composition was obtained.

Then, the reactive-type chromate treatment or coating-type chromate treatment was applied to the plated layer of an electrically galvanized steel sheet of 0.8 mm thick with a deposition amount of 20 g/$m^2$. The resultant steel plate was dried, thereby forming a chromate treated layer with a deposition amount of 10 to 200 mg/$m^2$.

Thereafter, on the chromate treated layer, each of various composite resin compositions synthesized in the Synthesis Example 2 was coated by means of a roll coater. Each of the coated solutions was dried by heating by use of an induction heating apparatus until the temperature of the steel plate reached 140° C. In this manner, each of the resin films was formed. Conditions of individual Examples are shown in Table 4.

Comparative Examples 4–1 to 4–16

In the Comparative Examples, a chromate treated layer was formed on the plated layer of the electrically galvanized steel plate which was the same as that used in Examples, in a deposition amount of 25 mg/$m^2$ by the reactive-type chromate treatment. On the chromate-treated layer, each of various resin films out of the scope of the present invention was formed under the conditions shown in Table 4.

The chromate deposition amounts shown in Table 4 are indicated in terms of a metal chromium amount. The ratio of the epoxy emulsion is expressed in terms of the weight ratio of ethylene-series ionomer resin/epoxy emulsion. The contents of silica and organic lubricant in the resin film are expressed by percentages based on the total amount (100%) of the resin and silica.

The organic-composite coated steel plates of Examples and Comparative Examples thus obtained were tested for anti-blackening property, corrosion resistance, and paint-adhesion. The results are also shown in Table 4.

As is evident from Table 4, any of the resin films of Examples 4–1 to 4–22 (Examples 1 to 22 in Table 4) is excellent in anti-blackening property, corrosion resistance, and paint-adhesion. Among them, the anti-blackening property is particularly excellent in Examples 4–1 and 4–14 which use the ethylene-methacryl acid copolymer and Na-neutralized ionomer as a base resin. The paint adhesion is particularly excellent in Examples 4–1 to 8, 11, and 12 containing ethylene-series ionomer resin and epoxy emulsion in a weight ratio of 1/9 to 9/1.

In contrast, in Comparative Examples 4–1 to 4–16 (Comparative Examples 1 to 16 in Table 4), there are no resins satisfying simultaneously all of the properties: anti-blackening property, corrosion resistance, and paint-adhesion property, as is apparent from Table 4. To be more specific, in the resin of Comparative Example 3–1, the paint adhesion is poor since the resin contains no epoxy emulsion. In Comparative Example 4–2, since the resin is made of the epoxy emulsion alone, it is poor in the anti-blackening property and corrosion resistance. The Comparative Examples 4–3 and 4—4 are inferior in corrosion resistance since the silica contents are out of the scope of the present invention. On the other hand, the resin of Comparative Example 4–5 is poor in corrosion resistance since the film thickness is smaller than the lowermost limit. In the resin film of Comparative Example 4–6, the film thickness is larger than the uppermost limit, the anti-blackening property is poor. In Comparative Examples 4–7 to 4–16, the resin films are insufficient in anti-blackening property, corrosion resistance, and paint-adhesion because the employed resins differ.

(Synthesis Example 3 for composite resin)

First, we will describe a method of synthesizing a base resin made of a mixture of reaction product I between an ethylene-series ionomer resin and an epoxy-group containing compound, and epoxy emulsion). The ethylene-methacrylic acid copolymer (100 g) partially neutralized with sodium hydroxide (methacrylic acid content: 15%, neutralization degree: 50%) was melted at 250° C., to prepare a molten product of an ethylene-series ionomer resin.

The molten product of an ethylene-series ionomer resin was added to water (300 g). The resultant mixture was charged into a pressure-resistant homomixer (an inner volume of 19) heated to 170° C. for about 2 hours while stirring at 1000 rpm. The mixture was then cooled to room temperature with stirring for a further 30 minutes. In this manner, the ethylene-series ionomer resin was dispersed into water in a concentration of 25%. The resultant water-dispersion-form ethylene-series ionomer resin had a viscosity of 600 cps (25° C.) and an average particle size of 1 $\mu$m or less.

Next, an aqueous solution (50 wt %) of tetraethylene glycol diglycidyl ether was prepared and added to the water-dispersion-form ethylene-series ionomer resin (100 g) in an amount of 5.0 g. The resultant mixture was stirred sufficiently to obtain water-dispersed type resin.

Next, an aqueous solution of the epoxy emulsion (40% by weight) having an epoxy skeleton with a molecular weight of 3500, was prepared. The aqueous solution (62.5 g) was added to the water-dispersion-form reaction product I (100 g) between ethylene-series ionomer resin and the epoxy-group containing compound, and then stirred. In this way, water-dispersion-form resin solution A was obtained.

Other resin solutions different in copolymer, epoxy-group containing compound, epoxy emulsion, and ratio of the epoxy emulsion to the reaction product I, were synthesized basically in the same manner and conditions.

The resins having different base resins for use in Comparative Examples were synthesized in the same manner as mentioned above. The resins are shown in Table 5 described later in the specification.

To the resins thus obtained, silica fine particles were added, to obtain composite resin compositions. The following is one of examples for the preparation of composite resin compositions:

Resin A (100 parts) was charged in a flask. To this, gradually added were 3.4 g of fumed silica (manufactured by Nippon Aerosil, commercially available under a trade name "Aerosil 300", a primary particle size: 7 nm) and 3.4 g of a polyethylene fine powder (particle size: 0.6 $\mu$m) having a molecular weight of 2000 as the organic lubricant while stirring sufficiently at normal temperature for about 10 minutes. In this manner, the composite resin composition was obtained.

Examples 5–1 to 5–43

The reactive-type chromate treatment or coating-type chromate treatment was applied to the plated layer of an electrically galvanized steel sheet of 0.8 mm thick with a deposition amount of 20 g/m$^2$. The resultant steel plate was dried, thereby forming a chromate treated layer in a deposition amount of 10 to 200 mg/m$^2$.

On the chromate treated layer, each of various composite resin compositions synthesized in the Synthesis Example 3 was coated by means of a roll coater. Thereafter, each of the coated solutions was dried by heating by use of an induction heating apparatus until the temperature of the steel plate reached 140° C. In this manner, each of the resin films was formed. Conditions of individual Examples are shown in Table 5.

Comparative Examples 5–1 to 5–77

In the Comparative Examples, a chromate treated layer was formed on the plated layer of the electrically galvanized steel plate which was the same as that used in Examples, in a deposition amount of 25 mg/m$^2$ by the reactive-type chromate treatment. On the chromate-treated layer, each of various resin films out of the scope of the present invention were formed under the conditions shown in Table 5.

The chromate deposition amounts shown in Table 5 are indicated in terms of a metal chromium amount. The contents of the epoxy-group containing compound are indicated by parts by weight based on 100 parts by weight of the ethylene-series ionomer resin. The ratio of the epoxy emulsion is expressed in terms of the weight ratio of the reaction product (I) to the epoxy emulsion. The contents of silica and organic lubricant in the resin film are expressed by percentages based on the total amount (100%) of the resin, silica, and organic lubricant.

The organic-composite coated steel plates of Examples and Comparative Examples thus obtained were tested for anti-blackening property, corrosion resistance, paint-adhesion and lubricating property. The results are also shown in Table 5.

As is evident from Table 5, any of the resin films of Examples 5–1 to 5–43 (Examples 1 to 45 in Table 5) is excellent in anti-blackening property, corrosion resistance, paint-adhesion, and lubricating property. Among them, the anti-blackening property is particularly excellent in Examples 5–1 and 5–32 which use the ethylene-methacryl acid copolymer and Na-neutralized ionomer as a base resin. Furthermore, any one of anti-blackening property, corrosion resistance, paint adhesion to the aforementioned 6 types of paints and lubricating property, is particularly excellent in Examples 5–2, 3, 5–11, 13, 14, 16, 20, 21, 23, 26, 29 and 30 characterized in that the resin film layer is made of a mixture of the reaction product I between the ethylene-series ionomer resin and the epoxy-group containing compound, and epoxy emulsion; the epoxy-group containing compound is di- or poly-diglycidyl ether of polyhydric alcohol and is contained in an amount of 0.5 to 20 parts by weight based on 100 parts by weight of the ethylene-series ionomer resin; and the ratio of the reaction product I to the epoxy emulsion is 1/9 to 9/1 by weight; and the content of organic lubricant is in an amount of 2 to 15 wt %.

In contrast, in Comparative Examples 5–1 to 5–77 (Comparative Examples 1 to 77 in Table 5), there are no resins satisfying simultaneously all of the properties: anti-blackening property, corrosion resistance, paint-adhesion, and lubricating property, as is apparent from Table 5. To be more specific, in the resins of Comparative Examples 5–7 and 5–8, the paint adhesion is poor since the content of the epoxy-group containing compound (30 parts by weight based on 100 parts by weight of the ethylene-series ionomer resin) is out of the scope of the present invention. In Comparative Example 5–23, since the resin contains no epoxy emulsion, it is poor in the paint-adhesion property. The resin film of Comparative Examples 5–24 is inferior in anti-blackening property and corrosion resistance since the resin is made of epoxy emulsion alone. The resin films of Comparative Example 5–1, 2, 9, 10, 25 and 26 are poor in corrosion resistance and paint adhesion since the silica contents are out of the scope of the present invention. The resin films of Comparative Examples 5—5, 5–11, and 5–27 are poor in corrosion resistance since the film thicknesses are smaller than the lowermost limit. The resin films of Comparative Examples 5–6, 5–12, and 5–28 are poor in anti-blackening property since the film thicknesses are larger than the uppermost limit. In Comparative Examples 5–13 to 5–22, and 5–29 to 5–33, the resin films are insufficient in anti-blackening property, corrosion resistance, and paint-adhesion because the employed resins differ. In Comparative Examples 5–34 to 55, there are some resin films not excellent in paint-adhesion to the aforementioned 6 types of paints since no epoxy emulsion is contained.

Examples 6–1 to 6–35

A base resin formed of a mixture of reaction product I between the ethylene-series ionomer resin and epoxy-group containing resin, and epoxy emulsion, was prepared in the same manner as in Example 5. To the base resin, silica fine particles (excluding the organic lubricant) were added, to obtain a composite resin composition.

Resin A (100 parts) was charged in a flask. To this, gradually added were 3.2 g of fumed silica (manufactured by Nippon Aerosil, commercially available under a trade name “Aerosil 300”, a primary particle size: 7 nm) while stirring sufficiently at normal temperature for about 10 minutes. In this manner, the composite resin composition was obtained.

Next, the reactive-type chromate treatment or coating-type chromate treatment was applied to the plated layer of an electrically galvanized steel sheet of 0.8 mm thick with a deposition amount of 20 $g/m^2$.

The resultant steel plate was dried, thereby forming a chromate treated layer in a deposition amount of 10 to 200 $mg/m^2$.

On the chromate treated layer, each of various composite resin compositions synthesized in the above was coated by means of a roll coater. Thereafter, the coated solution was dried by heating by use of an induction heating apparatus until the temperature of the steel plate reached 140° C. In this manner, each of the resin films was formed. Conditions of individual Examples are shown in Table 6.

Comparative Examples 6–1 to 6–75

In the Comparative Examples, a chromate treated layer was formed on the plated layer of the electrically galvanized steel plate which was the same as that used in Examples, in a deposition amount of 25 $mg/m^2$ by the reactive-type chromate treatment. On the chromate-treated layer, each of various resin films out of the scope of the present invention was formed under the conditions shown in Table 6.

The chromate deposition amounts shown in Table 6 are indicated in terms of a metal chromium amount. The contents of the epoxy-group containing compound are indicated by parts by weight based on 100 parts by weight of the ethylene-series ionomer resin. The ratio of the epoxy emulsion is expressed by the weight ratio of the reaction product (I) to the epoxy emulsion. The contents of silica in the resin film are expressed by percentages based on the total amount (100%) of the resin and silica.

The organic-composite coated steel plates of Examples and Comparative Examples thus obtained were tested for anti-blackening property, corrosion resistance, paint-adhesion and lubricating property. by the same evaluation method as performed in Example 5. The results are also shown in Table 6.

As is evident from Table 6, any of the resin films of Examples 6–1 to 6–35 (Examples 1 to 35 in Table 6) is excellent in anti-blackening property, corrosion resistance, paint-adhesion, and lubricating property. Among them, the anti-blackening property is particularly excellent in Examples 6–1 and 6–23 which use the ethylene-methacryl acid copolymer and Na-neutralized ionomer as a base resin. Furthermore, any of anti-blackening property, corrosion resistance, paint adhesion to the aforementioned 6 types of paints and lubricating property is particularly excellent in Examples 6–1 to 10, 13, 14, 17, 20, 21, 24–35 characterized in that the resin film layer is made of a mixture of the reaction product I between the ethylene-series ionomer resin and the epoxy-group containing compound, and epoxy emulsion; the epoxy-group containing compound is di- or poly-diglycidyl ether of polyhydric alcohol and is contained in an amount of 0.5 to 20 parts by weight based on 100 parts by weight of the ethylene-series ionomer resin; and the ratio of the reaction product I to the epoxy emulsion is 1/9 to 9/1 by weight.

In contrast, in Comparative Examples 6–1 to 6–75 (Comparative Examples 1 to 75 in Table 6), there are no resins satisfying simultaneously all of the properties: anti-blackening property, corrosion resistance, and paint-adhesion property, as is apparent from Table 6. To be more specific, in the resins of Comparative Examples 6–5 and 6–6, the paint adhesion is poor since the contents of the epoxy-group containing compound (1 to 30 parts by weight based on 100 parts by weight of the ethylene-series ionomer resin) are out of the scope of the present invention. In Comparative Example 6–21, since the resin contains no epoxy emulsion, it is poor in the paint-adhesion property. The resin film of Comparative Examples 6–22 is inferior in anti-blackening property and corrosion resistance since the resin is made of epoxy emulsion alone. The resin films of Comparative Example 6–1, 2, 7, 8, 23, and 24 are poor in corrosion resistance since the silica contents are out of the scope of the present invention. The resin films of Comparative Examples 6–3, 6–9, and 6–25 are poor in corrosion resistance since the film thicknesses are smaller than the lowermost limit. The resin films of Comparative Examples 6–4, 6–10, and 6–26 are poor in anti-blackening property since the film thicknesses are larger than the uppermost limit. In Comparative Examples 6–11 to 6–20, and 6–27 to 6–31, the resin films are insufficient in anti-blackening property, corrosion resistance, and paint-adhesion because the employed resins differ. In Comparative Examples 6–32 to 6–53, there are some resin films not excellent in paint-adhesion to the aforementioned 6 types of paints since no epoxy emulsion is contained. Furthermore, there are some resin films not excellent in paint-adhesion to the aforementioned 6 types of paints in Comparative Examples 6–54 to 6–75 since no reaction was made with the epoxy-group containing compound.

TABLE 1

| | | Chromate-treated layer | | Resin-film layer | | | | | | | | | |
|---|---|---|---|---|---|---|---|---|---|---|---|---|---|
| | | | | | Epoxy-group containing compound | | Silica | Organic lubricant | Film thickness | | | | |
| | | Type | Deposition amount (mg/m2) | Base resin Type | Type | Content (part by weight) | Content (%) | Content (%) | ($\mu$m) | Anti-blackening property | Corrosion resistance | Paint-adhesion | Lubricating property |
| Embodiment | 1 | Reactive type | 25 | A | a | 10 | 10 | 10 | 1 | ◎ | ◎ | ◎ | ◎ |
| | 2 | Reactive type | 25 | A | a | 20 | 10 | 10 | 1 | ◎ | ◎ | ◎ | ◎ |
| | 3 | Reactive type | 10 | A | a | 10 | 10 | 10 | 1 | ◎ | ◎ | ◎ | ◎ |
| | 4 | Reactive type | 200 | A | a | 10 | 10 | 10 | 1 | ◎ | ◎ | ◎ | ◎ |
| | 5 | Coating type | 25 | A | a | 10 | 10 | 10 | 1 | ◎ | ◎ | ◎ | ◎ |
| | 6 | Reactive type | 25 | A | a | 1 | 10 | 10 | 1 | ◎ | ◎ | ◎ | ◎ |
| | 7 | Reactive type | 25 | A | a | 10 | 10 | 1.5 | 1 | ◎ | ◎ | ◎ | ○ |
| | 8 | Reactive type | 25 | A | a | 10 | 10 | 2.5 | 1 | ◎ | ◎ | ◎ | ◎ |
| | 9 | Reactive type | 25 | A | a | 10 | 10 | 10 | 1 | ◎ | ◎ | ◎ | ◎ |
| | 10 | Reactive type | 25 | A | a | 10 | 10 | 20 | 1 | ◎ | ◎ | ○ | ◎ |
| | 11 | Reactive type | 25 | A | b | 1 | 10 | 10 | 1 | ◎ | ◎ | ◎ | ◎ |
| | 12 | Reactive type | 25 | A | b | 10 | 10 | 1.5 | 1 | ◎ | ◎ | ◎ | ○ |
| | 13 | Reactive type | 25 | A | b | 10 | 10 | 2.5 | 1 | ◎ | ◎ | ◎ | ◎ |
| | 14 | Reactive type | 25 | A | b | 10 | 10 | 10 | 1 | ◎ | ◎ | ◎ | ◎ |
| | 15 | Reactive type | 25 | A | b | 10 | 10 | 20 | 1 | ◎ | ◎ | ○ | ◎ |
| | 16 | Reactive type | 25 | A | a | 0.2 | 10 | 10 | 1 | ◎ | ◎ | ○ | ◎ |
| | 17 | Reactive type | 25 | A | a | 25 | 10 | 10 | 1 | ◎ | ◎ | ○ | ◎ |
| | 18 | Reactive type | 25 | A | a | 10 | 20 | 10 | 1 | ◎ | ◎ | ◎ | ◎ |
| | 19 | Reactive type | 25 | A | b | 10 | 20 | 10 | 1 | ◎ | ◎ | ◎ | ◎ |
| | 20 | Reactive type | 25 | A | c | 10 | 10 | 10 | 1 | ◎ | ◎ | ○ | ◎ |
| | 21 | Reactive type | 25 | A | d | 10 | 10 | 10 | 1 | ◎ | ◎ | ○ | ◎ |
| | 22 | Reactive type | 25 | B | a | 10 | 10 | 10 | 1 | ○ | ◎ | ◎ | ◎ |
| | 23 | Reactive type | 25 | B | b | 10 | 10 | 10 | 1 | ○ | ◎ | ◎ | ◎ |
| | 24 | Reactive type | 25 | C | a | 10 | 10 | 10 | 1 | ○ | ◎ | ◎ | ◎ |
| | 25 | Reactive type | 25 | C | b | 10 | 10 | 10 | 1 | ○ | ◎ | ◎ | ◎ |
| | 26 | Reactive type | 25 | D | a | 10 | 10 | 10 | 1 | ○ | ◎ | ◎ | ◎ |
| | 27 | Reactive type | 25 | D | b | 10 | 10 | 10 | 1 | ○ | ◎ | ◎ | ◎ |
| | 28 | Reactive type | 25 | E | a | 10 | 10 | 10 | 1 | ○ | ◎ | ◎ | ◎ |
| | 29 | Reactive type | 25 | E | b | 10 | 10 | 10 | 1 | ○ | ◎ | ◎ | ◎ |
| Comparative Example | 1 | Reactive type | 25 | A | a | 0.08 | 10 | 10 | 1 | ◎ | ◎ | Δ | ◎ |
| | 2 | Reactive type | 25 | A | a | 40 | 10 | 10 | 1 | ◎ | ◎ | Δ | Δ |
| | 3 | Reactive type | 25 | A | a | 10 | 0.05 | 10 | 1 | ◎ | Δ | ◎ | ◎ |
| | 4 | Reactive type | 25 | A | a | 10 | 50 | 10 | 1 | X | Δ | X | Δ |
| | 5 | Reactive type | 25 | A | a | 10 | 10 | 10 | 0.05 | ○ | X | X | Δ |
| | 6 | Reactive type | 25 | A | a | 10 | 10 | 10 | 7 | Δ | ◎ | ○ | ◎ |

TABLE 1-continued

| | Chromate-treated layer | | Resin-film layer | | | | | | | | | |
|---|---|---|---|---|---|---|---|---|---|---|---|---|
| | | | | Epoxy-group containing compound | | | | | | | | |
| | Type | Deposition amount (mg/m2) | Base resin Type | Type | Content (part by weight) | Silica Content (%) | Organic lubricant Content (%) | Film thickness ($\mu$m) | Anti-blackening property | Corrosion resistance | Paint-adhesion | Lubricating property |
| 7 | Reactive type | 25 | A | a | 10 | 10 | 0.05 | 1 | ⊚ | ⊚ | ⊚ | X |
| 8 | Reactive type | 25 | A | a | 10 | 10 | 40 | 1 | ⊚ | ⊚ | X | ⊚ |
| 9 | Reactive type | 25 | F | — | — | 10 | 10 | 1 | Δ | ○ | Δ | ⊚ |
| 10 | Reactive type | 25 | G | — | — | 10 | 10 | 1 | X | Δ | ○ | ⊚ |
| 11 | Reactive type | 25 | H | — | — | 10 | 10 | 1 | X | X | Δ | ⊚ |
| 12 | Reactive type | 25 | I | — | — | 10 | 10 | 1 | X | Δ | Δ | ⊚ |
| 13 | Reactive type | 25 | J | — | — | 20 | 10 | 1 | Δ | Δ | Δ | ⊚ |
| 14 | Reactive type | 25 | F | — | 10 | 20 | 10 | 1 | Δ | ○ | Δ | ⊚ |
| 15 | Reactive type | 25 | G | a | 10 | 10 | 10 | 1 | X | Δ | ○ | ⊚ |
| 16 | Reactive type | 25 | H | a | 10 | 10 | 10 | 1 | X | X | Δ | ⊚ |
| 17 | Reactive type | 25 | I | a | 10 | 10 | 10 | 1 | X | Δ | Δ | ⊚ |
| 18 | Reactive type | 25 | J | a | 10 | 10 | 10 | 1 | Δ | Δ | Δ | ⊚ |

TABLE 2

| | | Chromate-treated layer | | Resin-film layer | | | | | | | |
|---|---|---|---|---|---|---|---|---|---|---|---|
| | | | | | Epoxy-group containing compound | | | | | | |
| | | Type | Deposition amount (mg/m2) | Base resin Type | Type | Content (part by weight) | Silica Content (%) | Film thickness ($\mu$m) | Anti-blackening property | Corrosion resistance | Paint-adhesion |
| Embodiment | 1 | Reactive type | 25 | A | a | 10 | 10 | 1 | ⊚ | ⊚ | ⊚ |
| | 2 | Reactive type | 25 | A | a | 20 | 10 | 1 | ⊚ | ⊚ | ⊚ |
| | 3 | Reactive type | 10 | A | a | 10 | 10 | 1 | ⊚ | ⊚ | ⊚ |
| | 4 | Reactive type | 200 | A | a | 10 | 10 | 1 | ⊚ | ⊚ | ⊚ |
| | 5 | Coating type | 25 | A | a | 10 | 10 | 1 | ⊚ | ⊚ | ⊚ |
| | 6 | Reactive type | 25 | A | a | 1 | 10 | 1 | ⊚ | ⊚ | ⊚ |
| | 7 | Reactive type | 25 | A | b | 10 | 10 | 1 | ⊚ | ⊚ | ⊚ |
| | 8 | Reactive type | 25 | A | b | 1 | 10 | 1 | ⊚ | ⊚ | ⊚ |
| | 9 | Reactive type | 25 | A | a | 0.2 | 10 | 1 | ⊚ | ⊚ | ○ |
| | 10 | Reactive type | 25 | A | a | 25 | 10 | 1 | ⊚ | ⊚ | ○ |
| | 11 | Reactive type | 25 | A | a | 10 | 20 | 1 | ⊚ | ⊚ | ⊚ |
| | 12 | Reactive type | 25 | A | b | 10 | 20 | 1 | ⊚ | ⊚ | ⊚ |
| | 13 | Reactive type | 25 | A | c | 10 | 10 | 1 | ⊚ | ⊚ | ○ |
| | 14 | Reactive type | 25 | A | d | 10 | 10 | 1 | ⊚ | ⊚ | ○ |
| | 15 | Reactive type | 25 | B | a | 10 | 10 | 1 | ○ | ⊚ | ⊚ |
| | 16 | Reactive type | 25 | B | b | 10 | 10 | 1 | ○ | ⊚ | ⊚ |
| | 17 | Reactive type | 25 | C | a | 10 | 10 | 1 | ○ | ⊚ | ⊚ |
| | 18 | Reactive type | 25 | C | b | 10 | 10 | 1 | ○ | ⊚ | ⊚ |
| | 19 | Reactive type | 25 | D | a | 10 | 10 | 1 | ○ | ⊚ | ⊚ |
| | 20 | Reactive type | 25 | D | b | 10 | 10 | 1 | ○ | ⊚ | ⊚ |
| | 21 | Reactive type | 25 | E | a | 10 | 10 | 1 | ○ | ⊚ | ⊚ |
| | 22 | Reactive type | 25 | E | b | 10 | 10 | 1 | ○ | ⊚ | ⊚ |
| Comparative Example | 1 | Reactive type | 25 | A | a | 0.08 | 10 | 1 | ⊚ | ⊚ | Δ |
| | 2 | Reactive type | 25 | A | a | 40 | 10 | 1 | ⊚ | ⊚ | Δ |
| | 3 | Reactive type | 25 | A | a | 10 | 0.05 | 1 | ⊚ | Δ | ⊚ |
| | 4 | Reactive type | 25 | A | a | 10 | 50 | 1 | X | Δ | X |
| | 5 | Reactive type | 25 | A | a | 10 | 10 | 0.05 | ○ | X | X |
| | 6 | Reactive type | 25 | A | a | 10 | 10 | 7 | Δ | ⊚ | ○ |
| | 7 | Reactive type | 25 | F | — | — | 10 | 1 | Δ | ○ | Δ |
| | 8 | Reactive type | 25 | G | — | — | 10 | 1 | X | Δ | ○ |
| | 9 | Reactive type | 25 | H | — | — | 10 | 1 | X | X | Δ |

TABLE 2-continued

| | Chromate-treated layer | | Resin-film layer | | | | | | | |
|---|---|---|---|---|---|---|---|---|---|---|
| | | | | Epoxy-group containing compound | | | | | | |
| | Type | Deposition amount (mg/m2) | Base resin Type | Type | Content (part by weight) | Silica Content (%) | Film thickness ($\mu$m) | Anti-blackening property | Corrosion resistance | Paint-adhesion |
| 10 | Reactive type | 25 | I | — | — | 10 | 1 | X | Δ | Δ |
| 11 | Reactive type | 25 | J | — | — | 20 | 1 | Δ | Δ | Δ |
| 12 | Reactive type | 25 | F | a | 10 | 20 | 1 | Δ | ○ | Δ |
| 13 | Reactive type | 25 | G | a | 10 | 10 | 1 | X | Δ | ○ |
| 14 | Reactive type | 25 | H | a | 10 | 10 | 1 | X | X | Δ |
| 15 | Reactive type | 25 | I | a | 10 | 10 | 1 | X | Δ | Δ |
| 16 | Reactive type | 25 | J | a | 10 | 10 | 1 | Δ | Δ | Δ |

TABLE 3

| | | Chromate-treated layer | | Resin-film layer | | | | | | | | | |
|---|---|---|---|---|---|---|---|---|---|---|---|---|---|
| | | Type | Deposition amount (mg/m2) | Base resin Type | Epoxy emulsion Type | Ratio* | Silica Content (%) | Organic lubricant Content (%) | Film thickness ($\mu$m) | Anti-blackening property | Corrosion resistance | Paint-adhesion | Lubricating property |
| Embodiment | 1 | Reactive type | 25 | A | a | 7/3 | 10 | 10 | 1 | ⊚ | ⊚ | ⊚ | ⊚ |
| | 2 | Reactive type | 25 | A | a | 2/8 | 10 | 10 | 1 | ⊚ | ⊚ | ⊚ | ⊚ |
| | 3 | Reactive type | 10 | A | a | 7/3 | 10 | 10 | 1 | ⊚ | ⊚ | ⊚ | ⊚ |
| | 4 | Reactive type | 200 | A | a | 7/3 | 10 | 10 | 1 | ⊚ | ⊚ | ⊚ | ⊚ |
| | 5 | Coating type | 25 | A | a | 7/3 | 10 | 10 | 1 | ⊚ | ⊚ | ⊚ | ⊚ |
| | 6 | Reactive type | 25 | A | a | 8/2 | 10 | 10 | 1 | ⊚ | ⊚ | ⊚ | ⊚ |
| | 7 | Reactive type | 25 | A | a | 7/3 | 10 | 1.5 | 1 | ⊚ | ⊚ | ⊚ | ○ |
| | 8 | Reactive type | 25 | A | a | 7/3 | 10 | 2.5 | 1 | ⊚ | ⊚ | ⊚ | ⊚ |
| | 9 | Reactive type | 25 | A | a | 7/3 | 10 | 10 | 1 | ⊚ | ⊚ | ⊚ | ⊚ |
| | 10 | Reactive type | 25 | A | a | 7/3 | 10 | 20 | 1 | ⊚ | ⊚ | ○ | ⊚ |
| | 11 | Reactive type | 25 | A | b | 8/2 | 10 | 10 | 1 | ⊚ | ⊚ | ⊚ | ⊚ |
| | 12 | Reactive type | 25 | A | b | 7/3 | 10 | 1.5 | 1 | ⊚ | ⊚ | ⊚ | ○ |
| | 13 | Reactive type | 25 | A | b | 7/3 | 10 | 2.5 | 1 | ⊚ | ⊚ | ⊚ | ⊚ |
| | 14 | Reactive type | 25 | A | b | 7/3 | 10 | 10 | 1 | ⊚ | ⊚ | ⊚ | ⊚ |
| | 15 | Reactive type | 25 | A | b | 7/3 | 10 | 20 | 1 | ⊚ | ⊚ | ○ | ⊚ |
| | 16 | Reactive type | 25 | A | a | 8.5/1.5 | 10 | 10 | 1 | ⊚ | ⊚ | ○ | ⊚ |
| | 17 | Reactive type | 25 | A | a | 1.5/8.5 | 10 | 10 | 1 | ⊚ | ⊚ | ○ | ⊚ |
| | 18 | Reactive type | 25 | A | a | 7/3 | 20 | 10 | 1 | ⊚ | ⊚ | ⊚ | ⊚ |
| | 19 | Reactive type | 25 | A | b | 7/3 | 20 | 10 | 1 | ⊚ | ⊚ | ⊚ | ⊚ |
| | 20 | Reactive type | 25 | A | c | 7/3 | 10 | 10 | 1 | ⊚ | ⊚ | ○ | ⊚ |
| | 21 | Reactive type | 25 | A | d | 7/3 | 10 | 10 | 1 | ⊚ | ⊚ | ○ | ⊚ |
| | 22 | Reactive type | 25 | B | a | 7/3 | 10 | 10 | 1 | ○ | ⊚ | ⊚ | ⊚ |
| | 23 | Reactive type | 25 | B | b | 7/3 | 10 | 10 | 1 | ○ | ⊚ | ⊚ | ⊚ |
| | 24 | Reactive type | 25 | C | a | 7/3 | 10 | 10 | 1 | ○ | ⊚ | ⊚ | ⊚ |
| | 25 | Reactive | 25 | C | b | 7/3 | 10 | 10 | 1 | ○ | ⊚ | ⊚ | ⊚ |

TABLE 3-continued

| | | Chromate-treated layer | | Resin-film layer | | | | | | | | | |
|---|---|---|---|---|---|---|---|---|---|---|---|---|---|
| | | Type | Deposition amount (mg/m2) | Base resin Type | Epoxy emulsion Type | Ratio* | Silica Content (%) | Organic lubricant Content (%) | Film thick-ness (μm) | Anti-blackening property | Corrosion resistance | Paint-adhesion | Lubricating property |
| | | type | | | | | | | | | | | |
| | 26 | Reactive type | 25 | D | a | 7/3 | 10 | 10 | 1 | ○ | ⊚ | ⊚ | ⊚ |
| | 27 | Reactive type | 25 | D | b | 7/3 | 10 | 10 | 1 | ○ | ⊚ | ⊚ | ⊚ |
| | 28 | Reactive type | 25 | E | a | 7/3 | 10 | 10 | 1 | ○ | ⊚ | ⊚ | ⊚ |
| | 29 | Reactive type | 25 | E | b | 7/3 | 10 | 10 | 1 | ○ | ⊚ | ⊚ | ⊚ |
| Comparative Example | 1 | Reactive type | 25 | A | a | 10/0 | 10 | 10 | 1 | ⊚ | ⊚ | Δ | ⊚ |
| | 2 | Reactive type | 25 | A | a | 0/10 | 10 | 10 | 1 | Δ | Δ | ○ | Δ |
| | 3 | Reactive type | 25 | A | a | 7/3 | 0.05 | 10 | 1 | ⊚ | Δ | ⊚ | ⊚ |
| | 4 | Reactive type | 25 | A | a | 7/3 | 50 | 10 | 1 | X | Δ | X | Δ |
| | 5 | Reactive type | 25 | A | a | 7/3 | 10 | 10 | 0.05 | ○ | X | X | Δ |
| | 6 | Reactive type | 25 | A | a | 7/3 | 10 | 10 | 7 | Δ | ⊚ | ○ | ⊚ |
| | 7 | Reactive type | 25 | A | a | 7/3 | 10 | 0.05 | 1 | ⊚ | ⊚ | ⊚ | X |
| | 8 | Reactive type | 25 | A | a | 7/3 | 10 | 40 | 1 | ⊚ | ⊚ | X | ⊚ |
| | 9 | Reactive type | 25 | F | — | — | 10 | 10 | 1 | Δ | ○ | Δ | ⊚ |
| | 10 | Reactive type | 25 | G | — | — | 10 | 10 | 1 | X | Δ | ○ | ⊚ |
| | 11 | Reactive type | 25 | H | — | — | 10 | 10 | 1 | X | X | Δ | ⊚ |
| | 12 | Reactive type | 25 | I | — | — | 10 | 10 | 1 | X | Δ | Δ | ⊚ |
| | 13 | Reactive type | 25 | J | — | — | 20 | 10 | 1 | Δ | Δ | Δ | ⊚ |
| | 14 | Reactive type | 25 | F | a | 7/3 | 20 | 10 | 1 | Δ | ○ | Δ | ⊚ |
| | 15 | Reactive type | 25 | G | a | 7/3 | 10 | 10 | 1 | X | Δ | ○ | ⊚ |
| | 16 | Reactive type | 25 | H | a | 7/3 | 10 | 10 | 1 | X | X | Δ | ⊚ |
| | 17 | Reactive type | 25 | I | a | 7/3 | 10 | 10 | 1 | X | Δ | Δ | ⊚ |
| | 18 | Reactive type | 25 | J | a | 7/3 | 10 | 10 | 1 | Δ | Δ | Δ | ⊚ |

*Ratio: ethylene-base ionomer resin/epoxy emulsion

TABLE 4

| | | Chromate-treated layer | | Resin-film layer | | | | | | | |
|---|---|---|---|---|---|---|---|---|---|---|---|
| | | Type | Deposition amount (mg/m2) | Base resin Type | Epoxy emulsion Type | Ratio* | Silica Content (%) | Film thickness (μm) | Anti-blackening property | Corrosion resistance | Paint-adhesion |
| Embodiment | 1 | Reactive type | 25 | A | a | 7/3 | 10 | 1 | ⊚ | ⊚ | ⊚ |
| | 2 | Reactive type | 25 | A | a | 2/8 | 10 | 1 | ⊚ | ⊚ | ⊚ |
| | 3 | Reactive type | 10 | A | a | 7/3 | 10 | 1 | ⊚ | ⊚ | ⊚ |
| | 4 | Reactive type | 200 | A | a | 7/3 | 10 | 1 | ⊚ | ⊚ | ⊚ |
| | 5 | Coating type | 25 | A | a | 7/3 | 10 | 1 | ⊚ | ⊚ | ⊚ |
| | 6 | Reactive type | 25 | A | a | 8/2 | 10 | 1 | ⊚ | ⊚ | ⊚ |
| | 7 | Reactive type | 25 | A | b | 7/3 | 10 | 1 | ⊚ | ⊚ | ⊚ |
| | 8 | Reactive type | 25 | A | b | 8/2 | 10 | 1 | ⊚ | ⊚ | ○ |
| | 9 | Reactive type | 25 | A | a | 8.5/1.5 | 10 | 1 | ⊚ | ⊚ | ○ |
| | 10 | Reactive type | 25 | A | a | 1.5/8.5 | 10 | 1 | ⊚ | ⊚ | ⊚ |
| | 11 | Reactive type | 25 | A | a | 7/3 | 20 | 1 | ⊚ | ⊚ | ⊚ |
| | 12 | Reactive type | 25 | A | b | 7/3 | 20 | 1 | ⊚ | ⊚ | ⊚ |
| | 13 | Reactive type | 25 | A | c | 7/3 | 10 | 1 | ⊚ | ⊚ | ○ |

TABLE 4-continued

| | | Chromate-treated layer | | Resin-film layer | | | | | | | |
|---|---|---|---|---|---|---|---|---|---|---|---|
| | | Type | Deposition amount (mg/m2) | Base resin Type | Epoxy emulsion Type | Ratio* | Silica Content (%) | Film thickness (μm) | Anti-blackening property | Corrosion resistance | Paint-adhesion |
| | 14 | Reactive type | 25 | A | d | 7/3 | 10 | 1 | ⊚ | ⊚ | ○ |
| | 15 | Reactive type | 25 | B | a | 7/3 | 10 | 1 | ○ | ⊚ | ⊚ |
| | 16 | Reactive type | 25 | B | b | 7/3 | 10 | 1 | ○ | ⊚ | ⊚ |
| | 17 | Reactive type | 25 | C | a | 7/3 | 10 | 1 | ○ | ⊚ | ⊚ |
| | 18 | Reactive type | 25 | C | b | 7/3 | 10 | 1 | ○ | ⊚ | ⊚ |
| | 19 | Reactive type | 25 | D | a | 7/3 | 10 | 1 | ○ | ⊚ | ⊚ |
| | 20 | Reactive type | 25 | D | b | 7/3 | 10 | 1 | ○ | ⊚ | ⊚ |
| | 21 | Reactive type | 25 | E | a | 7/3 | 10 | 1 | ○ | ⊚ | ⊚ |
| | 22 | Reactive type | 25 | E | b | 7/3 | 10 | 1 | ○ | ⊚ | ⊚ |
| Comparative Example | 1 | Reactive type | 25 | A | a | 10/0 | 10 | 1 | ⊚ | ⊚ | Δ |
| | 2 | Reactive type | 25 | A | a | 0/10 | 10 | 1 | Δ | Δ | ○ |
| | 3 | Reactive type | 25 | A | a | 7/3 | 0.05 | 1 | ⊚ | Δ | ⊚ |
| | 4 | Reactive type | 25 | A | a | 7/3 | 50 | 1 | X | Δ | X |
| | 5 | Reactive type | 25 | A | a | 7/3 | 10 | 0.05 | ○ | X | X |
| | 6 | Reactive type | 25 | A | a | 7/3 | 10 | 7 | Δ | ⊚ | ○ |
| | 7 | Reactive type | 25 | F | — | — | 10 | 1 | Δ | ○ | Δ |
| | 8 | Reactive type | 25 | G | — | — | 10 | 1 | X | Δ | ○ |
| | 9 | Reactive type | 25 | H | — | — | 10 | 1 | X | X | Δ |
| | 10 | Reactive type | 25 | I | — | — | 10 | 1 | X | Δ | Δ |
| | 11 | Reactive type | 25 | J | — | — | 20 | 1 | Δ | Δ | Δ |
| | 12 | Reactive type | 25 | F | a | 7/3 | 20 | 1 | Δ | ○ | Δ |
| | 13 | Reactive type | 25 | G | a | 7/3 | 10 | 1 | X | Δ | ○ |
| | 14 | Reactive type | 25 | H | a | 7/3 | 10 | 1 | X | X | Δ |
| | 15 | Reactive type | 25 | I | a | 7/3 | 10 | 1 | X | Δ | Δ |
| | 16 | Reactive type | 25 | J | a | 7/3 | 10 | 1 | Δ | Δ | Δ |

*Ratio: ethylene-base ionomer resin/epoxy emulsion

TABLE 5

| | | Chromate-treated layer | | Resin-film layer | | | | | |
|---|---|---|---|---|---|---|---|---|---|
| | | | | | Epoxy-group containing compound | | | | |
| | | Type | Deposition amount (mg/m2) | Base resin Type | Type | Content (part by weight) | Epoxy emulsion Type | Ratio* | Silica Content (%) |
| Embodiment | 1 | Reactive type | 25 | A | a | 10 | aa | 7/3 | 10 |
| | 2 | Reactive type | 25 | A | a | 10 | aa | 7/3 | 10 |
| | 3 | Reactive type | 25 | A | a | 10 | aa | 7/3 | 10 |
| | 4 | Reactive type | 25 | A | a | 10 | aa | 7/3 | 10 |
| | 5 | Reactive type | 25 | A | a | 10 | aa | 2/8 | 10 |
| | 6 | Reactive type | 25 | A | a | 20 | aa | 7/3 | 10 |
| | 7 | Reactive type | 10 | A | a | 10 | aa | 7/3 | 10 |
| | 8 | Reactive type | 200 | A | a | 10 | aa | 7/3 | 10 |
| | 9 | Coating type | 25 | A | a | 10 | aa | 7/3 | 10 |
| | 10 | Reactive type | 25 | A | a | 1 | aa | 7/3 | 10 |
| | 11 | Reactive type | 25 | A | a | 10 | aa | 7/3 | 10 |
| | 12 | Reactive type | 25 | A | a | 10 | bb | 7/3 | 10 |
| | 13 | Reactive type | 25 | A | a | 10 | bb | 7/3 | 10 |
| | 14 | Reactive type | 25 | A | a | 10 | bb | 7/3 | 10 |
| | 15 | Reactive type | 25 | A | a | 10 | bb | 7/3 | 10 |
| | 16 | Reactive type | 25 | A | a | 10 | bb | 8/2 | 10 |
| | 17 | Reactive type | 25 | A | a | 10 | aa | 8.5/1.5 | 10 |
| | 18 | Reactive type | 25 | A | a | 10 | aa | 1.5/8.5 | 10 |
| | 19 | Reactive type | 25 | A | b | 10 | aa | 7/3 | 10 |
| | 20 | Reactive type | 25 | A | b | 10 | aa | 7/3 | 10 |
| | 21 | Reactive type | 25 | A | b | 10 | aa | 7/3 | 10 |
| | 22 | Reactive type | 25 | A | b | 10 | aa | 7/3 | 10 |
| | 23 | Reactive type | 25 | A | b | 1 | aa | 7/3 | 10 |
| | 24 | Reactive type | 25 | A | a | 0.2 | aa | 7/3 | 10 |
| | 25 | Reactive type | 25 | A | a | 25 | aa | 7/3 | 10 |
| | 26 | Reactive type | 25 | A | a | 10 | bb | 7/3 | 20 |
| | 27 | Reactive type | 25 | A | a | 10 | cc | 7/3 | 10 |
| | 28 | Reactive type | 25 | A | a | 10 | dd | 7/3 | 10 |
| | 29 | Reactive type | 25 | A | a | 10 | aa | 7/3 | 20 |
| | 30 | Reactive type | 25 | A | b | 10 | aa | 7/3 | 20 |
| | 31 | Reactive type | 25 | A | c | 10 | aa | 7/3 | 10 |
| | 32 | Reactive type | 25 | A | d | 10 | aa | 7/3 | 10 |

TABLE 5-continued

| | | | | | | | | | |
|---|---|---|---|---|---|---|---|---|---|
| | 33 | Reactive type | 25 | B | a | 10 | aa | 7/3 | 10 |
| | 34 | Reactive type | 25 | B | a | 10 | bb | 7/3 | 10 |
| | 35 | Reactive type | 25 | B | b | 10 | aa | 7/3 | 10 |
| | 36 | Reactive type | 25 | C | a | 10 | aa | 7/3 | 10 |
| | 37 | Reactive type | 25 | C | a | 10 | bb | 7/3 | 10 |
| | 38 | Reactive type | 25 | C | b | 10 | aa | 7/3 | 10 |
| | 39 | Reactive type | 25 | D | a | 10 | aa | 7/3 | 10 |
| | 40 | Reactive type | 25 | D | a | 10 | bb | 7/3 | 10 |
| | 41 | Reactive type | 25 | D | b | 10 | aa | 7/3 | 10 |
| | 42 | Reactive type | 25 | E | a | 10 | aa | 7/3 | 10 |
| | 43 | Reactive type | 25 | E | a | 10 | bb | 7/3 | 10 |
| | 44 | Reactive type | 25 | E | b | 10 | aa | 7/3 | 10 |
| Comparative Example | 1 | Reactive type | 25 | A | a | 10 | aa | 7/3 | 0.05 |
| | 2 | Reactive type | 25 | A | a | 10 | aa | 7/3 | 50 |
| | 3 | Reactive type | 25 | A | a | 10 | aa | 7/3 | 10 |
| | 4 | Reactive type | 25 | A | a | 10 | aa | 7/3 | 10 |
| | 5 | Reactive type | 25 | A | a | 10 | aa | 7/3 | 10 |
| | 6 | Reactive type | 25 | A | a | 10 | aa | 7/3 | 10 |
| | 7 | Reactive type | 25 | A | a | 0.08 | — | — | 10 |
| | 8 | Reactive type | 25 | A | a | 40 | — | — | 10 |
| | 9 | Reactive type | 25 | A | a | 10 | — | — | 0.05 |
| | 10 | Reactive type | 25 | A | a | 10 | — | — | 50 |
| | 11 | Reactive type | 25 | A | a | 10 | — | — | 10 |
| | 12 | Reactive type | 25 | A | a | 10 | — | — | 10 |
| | 13 | Reactive type | 25 | F | — | — | — | — | 10 |
| | 14 | Reactive type | 25 | G | — | — | — | — | 10 |
| | 15 | Reactive type | 25 | H | — | — | — | — | 10 |
| | 16 | Reactive type | 25 | I | — | — | — | — | 10 |
| | 17 | Reactive type | 25 | J | — | — | — | — | 20 |
| | 18 | Reactive type | 25 | F | a | 10 | — | — | 20 |
| | 19 | Reactive type | 25 | G | a | 10 | — | — | 10 |
| | 20 | Reactive type | 25 | H | a | 10 | — | — | 10 |
| | 21 | Reactive type | 25 | I | a | 10 | — | — | 10 |
| | 22 | Reactive type | 25 | J | a | 10 | — | — | 10 |
| | 23 | Reactive type | 25 | A | — | — | aa | 10/0 | 10 |
| | 24 | Reactive type | 25 | A | — | — | aa | 0/10 | 10 |
| | 25 | Reactive type | 25 | A | — | — | aa | 7/3 | 0.05 |
| | 26 | Reactive type | 25 | A | — | — | aa | 7/3 | 50 |
| | 27 | Reactive type | 25 | A | — | — | aa | 7/3 | 10 |
| | 28 | Reactive type | 25 | A | — | — | aa | 7/3 | 10 |
| | 29 | Reactive type | 25 | F | — | — | aa | 7/3 | 20 |
| | 30 | Reactive type | 25 | G | — | — | aa | 7/3 | 10 |
| | 31 | Reactive type | 25 | H | — | — | aa | 7/3 | 10 |
| | 32 | Reactive type | 25 | I | — | — | aa | 7/3 | 10 |
| | 33 | Reactive type | 25 | J | — | — | aa | 7/3 | 10 |
| | 34 | Reactive type | 25 | A | a | 10 | — | — | 10 |
| | 35 | Reactive type | 25 | A | a | 20 | — | — | 10 |
| | 36 | Reactive type | 10 | A | a | 10 | — | — | 10 |
| | 37 | Reactive type | 200 | A | a | 10 | — | — | 10 |
| | 38 | Coating type | 25 | A | a | 10 | — | — | 10 |
| | 39 | Reactive type | 25 | A | a | 1 | — | — | 10 |
| | 40 | Reactive type | 25 | A | b | 10 | — | — | 10 |
| | 41 | Reactive type | 25 | A | b | 1 | — | — | 10 |
| | 42 | Reactive type | 25 | A | a | 0.2 | — | — | 10 |
| | 43 | Reactive type | 25 | A | a | 25 | — | — | 10 |
| | 44 | Reactive type | 25 | A | a | 10 | — | — | 20 |
| | 45 | Reactive type | 25 | A | b | 10 | — | — | 20 |
| | 46 | Reactive type | 25 | A | c | 10 | — | — | 10 |
| | 47 | Reactive type | 25 | A | d | 10 | — | — | 10 |
| | 48 | Reactive type | 25 | B | a | 10 | — | — | 10 |
| | 49 | Reactive type | 25 | B | b | 10 | — | — | 10 |
| | 50 | Reactive type | 25 | C | a | 10 | — | — | 10 |
| | 51 | Reactive type | 25 | C | b | 10 | — | — | 10 |
| | 52 | Reactive type | 25 | D | a | 10 | — | — | 10 |
| | 53 | Reactive type | 25 | D | b | 10 | — | — | 10 |
| | 54 | Reactive type | 25 | E | a | 10 | — | — | 10 |
| | 55 | Reactive type | 25 | E | b | 10 | — | — | 10 |
| | 56 | Reactive type | 25 | A | — | — | aa | 7/3 | 10 |
| | 57 | Reactive type | 25 | A | — | — | aa | 2/8 | 10 |
| | 58 | Reactive type | 10 | A | — | — | aa | 7/3 | 10 |
| | 59 | Reactive type | 200 | A | — | — | aa | 7/3 | 10 |
| | 60 | Coating type | 25 | A | — | — | aa | 7/3 | 10 |
| | 61 | Reactive type | 25 | A | — | — | aa | 8/2 | 10 |
| | 62 | Reactive type | 25 | A | — | — | bb | 7/3 | 10 |
| | 63 | Reactive type | 25 | A | — | — | bb | 7/3 | 10 |
| | 64 | Reactive type | 25 | A | — | — | aa | 8.5/1.5 | 10 |
| | 65 | Reactive type | 25 | A | — | — | aa | 1.5/8.5 | 10 |
| | 66 | Reactive type | 25 | A | — | — | aa | 7/3 | 20 |
| | 67 | Reactive type | 25 | A | — | — | bb | 7/3 | 20 |

TABLE 5-continued

| | | | | | | | | |
|---|---|---|---|---|---|---|---|---|
| 68 | Reactive type | 25 | A | — | — | cc | 7/3 | 10 |
| 69 | Reactive type | 25 | A | — | — | dd | 7/3 | 10 |
| 70 | Reactive type | 25 | B | — | — | aa | 7/3 | 10 |
| 71 | Reactive type | 25 | B | — | — | bb | 7/3 | 10 |
| 72 | Reactive type | 25 | C | — | — | aa | 7/3 | 10 |
| 73 | Reactive type | 25 | C | — | — | bb | 7/3 | 10 |
| 74 | Reactive type | 25 | D | — | — | aa | 7/3 | 10 |
| 75 | Reactive type | 25 | D | — | — | bb | 7/3 | 10 |
| 76 | Reactive type | 25 | E | — | — | aa | 7/3 | 10 |
| 77 | Reactive type | 25 | E | — | — | bb | 7/3 | 10 |

| | | Resin-film layer | | | | | |
|---|---|---|---|---|---|---|---|
| | | Organic lubricant (%) | Film thickness (μm) | Anti-blackening property | Corrosion resistance | Paint adhesion (melamine alkyd-series paint) | Paint adhesion (polyester series power paint) |
| Embodiment | 1 | 1.5 | 1 | ⊚ | ⊚ | ⊚ | ⊚ |
| | 2 | 2.5 | 1 | ⊚ | ⊚ | ⊚ | ⊚ |
| | 3 | 10 | 1 | ⊚ | ⊚ | ⊚ | ⊚ |
| | 4 | 20 | 1 | ⊚ | ⊚ | ⊚ | ○ |
| | 5 | 10 | 1 | ⊚ | ⊚ | ⊚ | ⊚ |
| | 6 | 10 | 1 | ⊚ | ⊚ | ⊚ | ⊚ |
| | 7 | 10 | 1 | ⊚ | ⊚ | ⊚ | ⊚ |
| | 8 | 10 | 1 | ⊚ | ⊚ | ⊚ | ⊚ |
| | 9 | 10 | 1 | ⊚ | ⊚ | ⊚ | ⊚ |
| | 10 | 10 | 1 | ⊚ | ⊚ | ⊚ | ⊚ |
| | 11 | 10 | 1 | ⊚ | ⊚ | ⊚ | ⊚ |
| | 12 | 1.5 | 1 | ⊚ | ⊚ | ⊚ | ⊚ |
| | 13 | 2.5 | 1 | ⊚ | ⊚ | ⊚ | ⊚ |
| | 14 | 10 | 1 | ⊚ | ⊚ | ⊚ | ⊚ |
| | 15 | 20 | 1 | ⊚ | ⊚ | ⊚ | ○ |
| | 16 | 10 | 1 | ⊚ | ⊚ | ⊚ | ⊚ |
| | 17 | 10 | 1 | ⊚ | ⊚ | ○ | ○ |
| | 18 | 10 | 1 | ⊚ | ⊚ | ○ | ○ |
| | 19 | 1.5 | 1 | ⊚ | ⊚ | ⊚ | ⊚ |
| | 20 | 2.5 | 1 | ⊚ | ⊚ | ⊚ | ⊚ |
| | 21 | 10 | 1 | ⊚ | ⊚ | ⊚ | ⊚ |
| | 22 | 20 | 1 | ⊚ | ⊚ | ⊚ | ○ |
| | 23 | 10 | 1 | ⊚ | ⊚ | ⊚ | ⊚ |
| | 24 | 10 | 1 | ⊚ | ⊚ | ○ | ○ |
| | 25 | 10 | 1 | ⊚ | ⊚ | ○ | ○ |
| | 26 | 10 | 1 | ⊚ | ⊚ | ⊚ | ⊚ |
| | 27 | 10 | 1 | ⊚ | ⊚ | ○ | ○ |
| | 28 | 10 | 1 | ⊚ | ⊚ | ○ | ○ |
| | 29 | 10 | 1 | ⊚ | ⊚ | ⊚ | ⊚ |
| | 30 | 10 | 1 | ⊚ | ⊚ | ⊚ | ⊚ |
| | 31 | 10 | 1 | ⊚ | ⊚ | ○ | ○ |
| | 32 | 10 | 1 | ⊚ | ⊚ | ○ | ○ |
| | 33 | 10 | 1 | ○ | ⊚ | ⊚ | ⊚ |
| | 34 | 10 | 1 | ○ | ⊚ | ⊚ | ⊚ |
| | 35 | 10 | 1 | ○ | ⊚ | ⊚ | ⊚ |
| | 36 | 10 | 1 | ○ | ⊚ | ⊚ | ⊚ |
| | 37 | 10 | 1 | ○ | ⊚ | ⊚ | ⊚ |
| | 38 | 10 | 1 | ○ | ⊚ | ⊚ | ⊚ |
| | 39 | 10 | 1 | ○ | ⊚ | ⊚ | ⊚ |
| | 40 | 10 | 1 | ○ | ⊚ | ⊚ | ⊚ |
| | 41 | 10 | 1 | ○ | ⊚ | ⊚ | ⊚ |
| | 42 | 10 | 1 | ○ | ⊚ | ⊚ | ⊚ |
| | 43 | 10 | 1 | ○ | ⊚ | ⊚ | ⊚ |
| | 44 | 10 | 1 | ○ | ⊚ | ⊚ | ⊚ |
| Comparative Example | 1 | 10 | 1 | ⊚ | Δ | ○ | ○ |
| | 2 | 10 | 1 | ⊚ | Δ | x | x |
| | 3 | 0.05 | 1 | ⊚ | ⊚ | ⊚ | ⊚ |
| | 4 | 40 | 1 | ⊚ | ⊚ | x | x |
| | 5 | 10 | 0.05 | ○ | x | x | x |
| | 6 | 10 | 7 | Δ | ⊚ | ○ | ○ |
| | 7 | 10 | 1 | ⊚ | ⊚ | Δ | Δ |
| | 8 | 10 | 1 | ⊚ | ⊚ | Δ | Δ |
| | 9 | 10 | 1 | ⊚ | Δ | ⊚ | ○ |
| | 10 | 10 | 1 | x | Δ | x | x |
| | 11 | 10 | 0.05 | ○ | x | x | x |
| | 12 | 10 | 7 | Δ | ⊚ | ○ | ○ |
| | 13 | 10 | 1 | Δ | ○ | Δ | Δ |
| | 14 | 10 | 1 | x | ○ | ○ | ○ |
| | 15 | 10 | 1 | x | x | Δ | Δ |
| | 16 | 10 | 1 | x | Δ | Δ | Δ |
| | 17 | 10 | 1 | Δ | Δ | Δ | Δ |
| | 18 | 10 | 1 | Δ | ○ | Δ | Δ |

TABLE 5-continued

| | | | | | | | |
|---|---|---|---|---|---|---|---|
| | 19 | 10 | 1 | x | Δ | ○ | ○ |
| | 20 | 10 | 1 | x | x | Δ | Δ |
| | 21 | 10 | 1 | x | Δ | Δ | Δ |
| | 22 | 20 | 1 | Δ | Δ | Δ | Δ |
| | 23 | 10 | 1 | ⊚ | ⊚ | Δ | Δ |
| | 24 | 10 | 1 | Δ | Δ | ○ | ○ |
| | 25 | 10 | 1 | ⊚ | Δ | ⊚ | ○ |
| | 26 | 10 | 1 | x | Δ | x | x |
| | 27 | 10 | 0.05 | ○ | x | x | x |
| | 28 | 10 | 7 | Δ | ⊚ | ○ | ○ |
| | 29 | 10 | 1 | Δ | ○ | Δ | Δ |
| | 30 | 10 | 1 | x | Δ | ○ | ○ |
| | 31 | 10 | 1 | x | x | Δ | Δ |
| | 32 | 10 | 1 | x | Δ | Δ | Δ |
| | 33 | 10 | 1 | Δ | Δ | Δ | Δ |
| | 34 | 10 | 1 | ⊚ | ⊚ | ⊚ | Δ |
| | 35 | 10 | 1 | ⊚ | ⊚ | ⊚ | ○ |
| | 36 | 10 | 1 | ⊚ | ⊚ | ⊚ | Δ |
| | 37 | 10 | 1 | ⊚ | ⊚ | ⊚ | Δ |
| | 38 | 10 | 1 | ⊚ | ⊚ | ⊚ | Δ |
| | 39 | 10 | 1 | ⊚ | ⊚ | ⊚ | Δ |
| | 40 | 10 | 1 | ⊚ | ⊚ | ⊚ | Δ |
| | 41 | 10 | 1 | ⊚ | ⊚ | ⊚ | Δ |
| | 42 | 10 | 1 | ⊚ | ⊚ | ○ | ○ |
| | 43 | 10 | 1 | ⊚ | ⊚ | ○ | Δ |
| | 44 | 10 | 1 | ⊚ | ⊚ | ⊚ | Δ |
| | 45 | 10 | 1 | ⊚ | ⊚ | ⊚ | Δ |
| | 46 | 10 | 1 | ⊚ | ⊚ | ○ | Δ |
| | 47 | 10 | 1 | ⊚ | ⊚ | ○ | Δ |
| | 48 | 10 | 1 | ○ | ⊚ | ⊚ | Δ |
| | 49 | 10 | 1 | ○ | ⊚ | ⊚ | Δ |
| | 50 | 10 | 1 | ○ | ⊚ | ⊚ | Δ |
| | 51 | 10 | 1 | ○ | ⊚ | ⊚ | Δ |
| | 52 | 10 | 1 | ○ | ⊚ | ⊚ | Δ |
| | 53 | 10 | 1 | ○ | ⊚ | ⊚ | Δ |
| | 54 | 10 | 1 | ○ | ⊚ | ⊚ | Δ |
| | 55 | 10 | 1 | ○ | ⊚ | ⊚ | Δ |
| | 56 | 10 | 1 | ⊚ | ⊚ | ⊚ | Δ |
| | 57 | 10 | 1 | ⊚ | ⊚ | ⊚ | Δ |
| | 58 | 10 | 1 | ⊚ | ⊚ | ⊚ | ○ |
| | 59 | 10 | 1 | ⊚ | ⊚ | ⊚ | Δ |
| | 60 | 10 | 1 | ⊚ | ⊚ | ⊚ | Δ |
| | 61 | 10 | 1 | ⊚ | ⊚ | ⊚ | Δ |
| | 62 | 10 | 1 | ⊚ | ⊚ | ⊚ | Δ |
| | 63 | 10 | 1 | ⊚ | ⊚ | ⊚ | Δ |
| | 64 | 10 | 1 | ⊚ | ⊚ | ○ | Δ |
| | 65 | 10 | 1 | ⊚ | ⊚ | ○ | ○ |
| | 66 | 10 | 1 | ⊚ | ⊚ | ⊚ | Δ |
| | 67 | 10 | 1 | ⊚ | ⊚ | ⊚ | Δ |
| | 68 | 10 | 1 | ⊚ | ⊚ | ○ | Δ |
| | 69 | 10 | 1 | ⊚ | ⊚ | ○ | Δ |
| | 70 | 10 | 1 | ○ | ⊚ | ⊚ | Δ |
| | 71 | 10 | 1 | ○ | ⊚ | ⊚ | Δ |
| | 72 | 10 | 1 | ○ | ⊚ | ⊚ | Δ |
| | 73 | 10 | 1 | ○ | ⊚ | ⊚ | Δ |
| | 74 | 10 | 1 | ○ | ⊚ | ⊚ | Δ |
| | 75 | 10 | 1 | ○ | ⊚ | ⊚ | Δ |
| | 76 | 10 | 1 | ○ | ⊚ | ⊚ | Δ |
| | 77 | 10 | 1 | ○ | ⊚ | ⊚ | Δ |

| | | Paint adhesion (epoxy-series powder paint) | Paint adhesion (acryl-series paint) | Paint adhesion (urethan-series paint) | Ink adhesiveness (epoxy-series ink) | Lubricating property |
|---|---|---|---|---|---|---|
| Embodiment | 1 | ⊚ | ⊚ | ⊚ | ⊚ | ○ |
| | 2 | ⊚ | ⊚ | ⊚ | ⊚ | ⊚ |
| | 3 | ⊚ | ⊚ | ⊚ | ⊚ | ⊚ |
| | 4 | ○ | ○ | ○ | ○ | ⊚ |
| | 5 | ⊚ | ⊚ | ⊚ | ⊚ | ⊚ |
| | 6 | ⊚ | ⊚ | ⊚ | ⊚ | ⊚ |
| | 7 | ⊚ | ⊚ | ⊚ | ⊚ | ⊚ |
| | 8 | ⊚ | ⊚ | ⊚ | ⊚ | ⊚ |
| | 9 | ⊚ | ⊚ | ⊚ | ⊚ | ⊚ |
| | 10 | ⊚ | ⊚ | ⊚ | ⊚ | ⊚ |
| | 11 | ⊚ | ⊚ | ⊚ | ⊚ | ⊚ |
| | 12 | ⊚ | ⊚ | ⊚ | ⊚ | ○ |
| | 13 | ⊚ | ⊚ | ⊚ | ⊚ | ⊚ |
| | 14 | ⊚ | ⊚ | ⊚ | ⊚ | ⊚ |
| | 15 | ○ | ○ | ○ | ○ | ⊚ |

TABLE 5-continued

| | | | | | | |
|---|---|---|---|---|---|---|
| | 16 | ⊚ | ⊚ | ⊚ | ⊚ | ⊚ |
| | 17 | ⊚ | ○ | ○ | ○ | ⊚ |
| | 18 | ⊚ | ○ | ○ | ○ | ⊚ |
| | 19 | ⊚ | ⊚ | ⊚ | ⊚ | ○ |
| | 20 | ⊚ | ⊚ | ⊚ | ⊚ | ⊚ |
| | 21 | ⊚ | ⊚ | ⊚ | ⊚ | ⊚ |
| | 22 | ○ | ○ | ○ | ○ | ⊚ |
| | 23 | ⊚ | ⊚ | ⊚ | ⊚ | ⊚ |
| | 24 | ⊚ | ○ | ○ | ○ | ⊚ |
| | 25 | ⊚ | ○ | ○ | ○ | ⊚ |
| | 26 | ⊚ | ⊚ | ⊚ | ⊚ | ⊚ |
| | 27 | ⊚ | ○ | ○ | ○ | ⊚ |
| | 28 | ⊚ | ○ | ○ | ○ | ⊚ |
| | 29 | ⊚ | ⊚ | ⊚ | ⊚ | ⊚ |
| | 30 | ⊚ | ⊚ | ⊚ | ⊚ | ⊚ |
| | 31 | ⊚ | ○ | ○ | ○ | ⊚ |
| | 32 | ⊚ | ○ | ○ | ○ | ⊚ |
| | 33 | ⊚ | ⊚ | ⊚ | ⊚ | ⊚ |
| | 34 | ⊚ | ⊚ | ⊚ | ⊚ | ⊚ |
| | 35 | ⊚ | ⊚ | ⊚ | ⊚ | ⊚ |
| | 36 | ⊚ | ⊚ | ⊚ | ⊚ | ⊚ |
| | 37 | ⊚ | ⊚ | ⊚ | ⊚ | ⊚ |
| | 38 | ⊚ | ⊚ | ⊚ | ⊚ | ⊚ |
| | 39 | ⊚ | ⊚ | ⊚ | ⊚ | ⊚ |
| | 40 | ⊚ | ⊚ | ⊚ | ⊚ | ⊚ |
| | 41 | ⊚ | ⊚ | ⊚ | ⊚ | ⊚ |
| | 42 | ⊚ | ⊚ | ⊚ | ⊚ | ⊚ |
| | 43 | ⊚ | ⊚ | ⊚ | ⊚ | ⊚ |
| | 44 | ⊚ | ⊚ | ⊚ | ⊚ | ⊚ |
| Comparative Example | 1 | ○ | ○ | ○ | ○ | ⊚ |
| | 2 | Δ | x | Δ | x | ⊚ |
| | 3 | ⊚ | ⊚ | ⊚ | ⊚ | x |
| | 4 | x | x | x | x | ⊚ |
| | 5 | Δ | x | x | x | ⊚ |
| | 6 | ○ | ○ | ○ | ○ | ⊚ |
| | 7 | Δ | Δ | Δ | Δ | ⊚ |
| | 8 | Δ | Δ | Δ | Δ | ⊚ |
| | 9 | ⊚ | ○ | ⊚ | ○ | ⊚ |
| | 10 | Δ | x | Δ | x | ⊚ |
| | 11 | Δ | x | Δ | x | ⊚ |
| | 12 | ○ | ○ | ○ | ○ | ⊚ |
| | 13 | Δ | Δ | Δ | Δ | ⊚ |
| | 14 | ○ | ○ | ○ | ○ | ⊚ |
| | 15 | Δ | Δ | Δ | Δ | ⊚ |
| | 16 | Δ | Δ | Δ | Δ | ⊚ |
| | 17 | Δ | Δ | Δ | Δ | ⊚ |
| | 18 | Δ | Δ | Δ | Δ | ⊚ |
| | 19 | ○ | ○ | ○ | ○ | ⊚ |
| | 20 | Δ | Δ | Δ | Δ | ⊚ |
| | 21 | Δ | Δ | Δ | Δ | ⊚ |
| | 22 | Δ | Δ | Δ | Δ | ⊚ |
| | 23 | Δ | Δ | Δ | Δ | ⊚ |
| | 24 | ○ | ○ | ○ | ○ | ⊚ |
| | 25 | ⊚ | ○ | ○ | ○ | ⊚ |
| | 26 | Δ | x | x | x | ⊚ |
| | 27 | Δ | x | x | x | ⊚ |
| | 28 | ○ | ○ | ○ | ○ | ⊚ |
| | 29 | Δ | Δ | Δ | Δ | ⊚ |
| | 30 | ○ | ○ | ○ | ○ | ⊚ |
| | 31 | Δ | Δ | Δ | Δ | ⊚ |
| | 32 | Δ | Δ | Δ | Δ | ⊚ |
| | 33 | Δ | Δ | Δ | Δ | ⊚ |
| | 34 | ⊚ | Δ | ⊚ | ○ | ⊚ |
| | 35 | ⊚ | Δ | ⊚ | ○ | ⊚ |
| | 36 | ⊚ | Δ | ⊚ | ○ | x |
| | 37 | ⊚ | Δ | ⊚ | ○ | ⊚ |
| | 38 | ⊚ | Δ | ⊚ | ○ | ⊚ |
| | 39 | ⊚ | Δ | ⊚ | ○ | ⊚ |
| | 40 | ⊚ | Δ | ⊚ | ○ | ⊚ |
| | 41 | ⊚ | Δ | ⊚ | ○ | ⊚ |
| | 42 | ○ | Δ | ○ | Δ | ⊚ |
| | 43 | ○ | Δ | ○ | ○ | ⊚ |
| | 44 | ⊚ | Δ | ⊚ | ○ | ⊚ |
| | 45 | ⊚ | Δ | ⊚ | ○ | ⊚ |
| | 46 | ○ | Δ | ○ | Δ | ⊚ |
| | 47 | ○ | Δ | ○ | Δ | ⊚ |
| | 48 | ⊚ | Δ | ⊚ | ○ | ⊚ |
| | 49 | ⊚ | Δ | ⊚ | ○ | ⊚ |
| | 50 | ⊚ | Δ | ⊚ | ○ | ⊚ |

TABLE 5-continued

| | | | | | |
|---|---|---|---|---|---|
| 51 | ◎ | Δ | ◎ | ○ | ◎ |
| 52 | ◎ | Δ | ◎ | ○ | ◎ |
| 53 | ◎ | Δ | ◎ | ○ | ◎ |
| 54 | ◎ | Δ | ◎ | ○ | ◎ |
| 55 | ◎ | Δ | ◎ | ○ | ◎ |
| 56 | ◎ | Δ | ◎ | ○ | ◎ |
| 57 | ◎ | Δ | ◎ | ○ | ◎ |
| 58 | ◎ | Δ | ◎ | ○ | ◎ |
| 59 | ◎ | Δ | ◎ | ○ | ◎ |
| 60 | ◎ | Δ | ◎ | ○ | ◎ |
| 61 | ◎ | Δ | ◎ | ○ | ◎ |
| 62 | ◎ | Δ | ◎ | ○ | ◎ |
| 63 | ◎ | Δ | ◎ | ○ | ◎ |
| 64 | ○ | Δ | ○ | Δ | ◎ |
| 65 | ○ | Δ | ○ | ○ | ◎ |
| 66 | ◎ | Δ | ◎ | ○ | ◎ |
| 67 | ◎ | Δ | ◎ | ○ | ◎ |
| 68 | ○ | Δ | ○ | Δ | ◎ |
| 69 | ○ | Δ | ○ | Δ | ◎ |
| 70 | ◎ | Δ | ◎ | ○ | ◎ |
| 71 | ◎ | Δ | ◎ | ○ | ◎ |
| 72 | ◎ | Δ | ◎ | ○ | ◎ |
| 73 | ◎ | Δ | ◎ | ○ | ◎ |
| 74 | ◎ | Δ | ◎ | ○ | ◎ |
| 75 | ◎ | Δ | ◎ | ○ | ◎ |
| 76 | ◎ | Δ | ◎ | ○ | ◎ |
| 77 | ◎ | Δ | ◎ | ○ | ◎ |

Ratio*: (Reaction product between an etylene-base uonomer resin and an epoxty-group containing compound/epoxyemulsion

TABLE 6

| | | Chromate-treated layer | | Resin-film layer | | | | | | Resin-film | | |
|---|---|---|---|---|---|---|---|---|---|---|---|---|
| | | | Deposition | Base | Epoxy-group containing compound | | Epoxy | | Silica | layer Film | Anti- | |
| | | Type | amount (mg/m2) | resin Type | Type | Content (part by weight) | emulsion Type | Ratio* | Content (%) | thickness (μm) | blackening property | Corrosion resistance |
| Embodiment | 1 | Reactive type | 25 | A | a | 10 | aa | 7/3 | 10 | 1 | ◎ | ◎ |
| | 2 | Reactive type | 25 | A | a | 10 | aa | 2/8 | 10 | 1 | ◎ | ◎ |
| | 3 | Reactive type | 25 | A | a | 20 | aa | 7/3 | 10 | 1 | ◎ | ◎ |
| | 4 | Reactive type | 10 | A | a | 10 | aa | 7/3 | 10 | 1 | ◎ | ◎ |
| | 5 | Reactive type | 200 | A | a | 10 | aa | 7/3 | 10 | 1 | ◎ | ◎ |
| | 6 | Coating type | 25 | A | a | 10 | aa | 7/3 | 10 | 1 | ◎ | ◎ |
| | 7 | Reactive type | 25 | A | a | 1 | aa | 7/3 | 10 | 1 | ◎ | ◎ |
| | 8 | Reactive type | 25 | A | a | 10 | aa | 8/2 | 10 | 1 | ◎ | ◎ |
| | 9 | Coating type | 25 | A | a | 10 | bb | 7/3 | 10 | 1 | ◎ | ◎ |
| | 10 | Reactive type | 25 | A | a | 10 | bb | 8/2 | 10 | 1 | ◎ | ◎ |
| | 11 | Reactive type | 25 | A | a | 10 | aa | 8.5/1.5 | 10 | 1 | ◎ | ◎ |
| | 12 | Reactive type | 25 | A | a | 10 | aa | 1.5/8.5 | 10 | 1 | ◎ | ◎ |
| | 13 | Reactive type | 25 | A | b | 10 | aa | 7/3 | 10 | 1 | ◎ | ◎ |
| | 14 | Reactive type | 25 | A | b | 1 | aa | 7/3 | 10 | 1 | ◎ | ◎ |
| | 15 | Reactive type | 25 | A | a | 0.2 | aa | 7/3 | 10 | 1 | ◎ | ◎ |
| | 16 | Reactive type | 25 | A | a | 25 | aa | 7/3 | 10 | 1 | ◎ | ◎ |
| | 17 | Reactive type | 25 | A | a | 10 | bb | 7/3 | 20 | 1 | ◎ | ◎ |
| | 18 | Reactive type | 25 | A | a | 10 | cc | 7/3 | 10 | 1 | ◎ | ◎ |
| | 19 | Reactive type | 25 | A | a | 10 | dd | 7/3 | 10 | 1 | ◎ | ◎ |
| | 20 | Reactive type | 25 | A | a | 10 | aa | 7/3 | 20 | 1 | ◎ | ◎ |
| | 21 | Reactive type | 25 | A | b | 10 | aa | 7/3 | 20 | 1 | ◎ | ◎ |
| | 22 | Reactive type | 25 | A | c | 10 | aa | 7/3 | 10 | 1 | ◎ | ◎ |
| | 23 | Reactive type | 25 | A | d | 10 | aa | 7/3 | 10 | 1 | ◎ | ◎ |
| | 24 | Reactive type | 25 | B | a | 10 | aa | 7/3 | 10 | 1 | ○ | ◎ |
| | 25 | Reactive type | 25 | B | a | 10 | bb | 7/3 | 10 | 1 | ○ | ◎ |
| | 26 | Reactive type | 25 | B | b | 10 | aa | 7/3 | 10 | 1 | ○ | ◎ |
| | 27 | Reactive type | 25 | C | a | 10 | aa | 7/3 | 10 | 1 | ○ | ◎ |
| | 28 | Reactive type | 25 | C | a | 10 | bb | 7/3 | 10 | 1 | ○ | ◎ |
| | 29 | Reactive type | 25 | C | b | 10 | aa | 7/3 | 10 | 1 | ○ | ◎ |
| | 30 | Reactive type | 25 | D | a | 10 | aa | 7/3 | 10 | 1 | ○ | ◎ |
| | 31 | Reactive type | 25 | D | a | 10 | bb | 7/3 | 10 | 1 | ○ | ◎ |
| | 32 | Reactive type | 25 | D | b | 10 | aa | 7/3 | 10 | 1 | ○ | ◎ |
| | 33 | Reactive type | 25 | E | a | 10 | aa | 7/3 | 10 | 1 | ◎ | ◎ |
| | 34 | Reactive type | 25 | E | a | 10 | bb | 7/3 | 10 | 1 | ◎ | ◎ |
| | 35 | Reactive type | 25 | E | b | 10 | aa | 7/3 | 10 | 1 | ◎ | ◎ |

TABLE 6-continued

| | | | | | | | | | | | | |
|---|---|---|---|---|---|---|---|---|---|---|---|---|
| Comparative Example | 1 | Reactive type | 25 | A | a | 10 | aa | 7/3 | 0.05 | 1 | ⊚ | Δ |
| | 2 | Reactive type | 25 | A | a | 10 | aa | 7/3 | 50 | 1 | ⊚ | Δ |
| | 3 | Reactive type | 25 | A | a | 10 | aa | 7/3 | 10 | 0.05 | ○ | X |
| | 4 | Reactive type | 25 | A | a | 10 | aa | 7/3 | 10 | 7 | Δ | ⊚ |
| | 5 | Reactive type | 25 | A | a | 0.08 | — | — | 10 | 1 | ⊚ | ⊚ |
| | 6 | Reactive type | 25 | A | a | 40 | — | — | 10 | 1 | ⊚ | ⊚ |
| | 7 | Reactive type | 25 | A | a | 10 | — | — | 0.05 | 1 | ⊚ | Δ |
| | 8 | Reactive type | 25 | A | a | 10 | — | — | 50 | 1 | X | Δ |
| | 9 | Reactive type | 25 | A | a | 10 | — | — | 10 | 0.05 | ○ | X |
| | 10 | Reactive type | 25 | A | a | 10 | — | — | 10 | 7 | Δ | ⊚ |
| | 11 | Reactive type | 25 | F | — | — | — | — | 10 | 1 | Δ | ○ |
| | 12 | Reactive type | 25 | G | — | — | — | — | 10 | 1 | X | Δ |
| | 13 | Reactive type | 25 | H | — | — | — | — | 10 | 1 | X | X |
| | 14 | Reactive type | 25 | I | — | — | — | — | 10 | 1 | X | Δ |
| | 15 | Reactive type | 25 | J | — | — | — | — | 20 | 1 | Δ | Δ |
| | 16 | Reactive type | 25 | F | a | 10 | — | — | 20 | 1 | Δ | ⊚ |
| | 17 | Reactive type | 25 | G | a | 10 | — | — | 10 | 1 | X | Δ |
| | 18 | Reactive type | 25 | H | a | 10 | — | — | 10 | 1 | X | X |
| | 19 | Reactive type | 25 | I | a | 10 | — | — | 10 | 1 | X | Δ |
| | 20 | Reactive type | 25 | J | a | 10 | — | — | 10 | 1 | Δ | Δ |
| | 21 | Reactive type | 25 | A | — | — | aa | 10/0 | 10 | 1 | ⊚ | ⊚ |
| | 22 | Reactive type | 25 | A | — | — | aa | 0/10 | 10 | 1 | Δ | Δ |
| | 23 | Reactive type | 25 | A | — | — | aa | 7/3 | 0.05 | 1 | ⊚ | Δ |
| | 24 | Reactive type | 25 | A | — | — | aa | 7/3 | 50 | 1 | X | Δ |
| | 25 | Reactive type | 25 | A | — | — | aa | 7/3 | 10 | 0.05 | ○ | X |
| | 26 | Reactive type | 25 | A | — | — | aa | 7/3 | 10 | 7 | Δ | ⊚ |
| | 27 | Reactive type | 25 | F | — | — | aa | 7/3 | 20 | 1 | Δ | ○ |
| | 28 | Reactive type | 25 | G | — | — | aa | 7/3 | 10 | 1 | X | Δ |
| | 29 | Reactive type | 25 | H | — | — | aa | 7/3 | 10 | 1 | X | X |
| | 30 | Reactive type | 25 | I | — | — | aa | 7/3 | 10 | 1 | X | Δ |
| | 31 | Reactive type | 25 | J | — | — | aa | 7/3 | 10 | 1 | Δ | Δ |
| | 32 | Reactive type | 25 | A | a | 10 | — | — | 10 | 1 | ⊚ | ⊚ |
| | 33 | Reactive type | 25 | A | a | 20 | — | — | 10 | 1 | ⊚ | ⊚ |
| | 34 | Reactive type | 10 | A | a | 10 | — | — | 10 | 1 | ⊚ | ⊚ |
| | 35 | Reactive type | 200 | A | a | 10 | — | — | 10 | 1 | ⊚ | ⊚ |
| | 36 | Reactive type | 25 | A | a | 10 | — | — | 10 | 1 | ⊚ | ⊚ |
| | 37 | Reactive type | 25 | A | a | 1 | — | — | 10 | 1 | ⊚ | ⊚ |
| | 38 | Reactive type | 25 | A | b | 10 | — | — | 10 | 1 | ⊚ | ⊚ |
| | 39 | Reactive type | 25 | A | b | 1 | — | — | 10 | 1 | ⊚ | ⊚ |
| | 40 | Reactive type | 25 | A | a | 0.2 | — | — | 10 | 1 | ⊚ | ⊚ |
| | 41 | Reactive type | 25 | A | a | 25 | — | — | 10 | 1 | ⊚ | ⊚ |
| | 42 | Reactive type | 25 | A | a | 10 | — | — | 20 | 1 | ⊚ | ⊚ |
| | 43 | Reactive type | 25 | A | b | 10 | — | — | 20 | 1 | ⊚ | ⊚ |
| | 44 | Reactive type | 25 | A | c | 10 | — | — | 10 | 1 | ⊚ | ⊚ |
| | 45 | Reactive type | 25 | A | d | 10 | — | — | 10 | 1 | ⊚ | ⊚ |
| | 46 | Reactive type | 25 | B | a | 10 | — | — | 10 | 1 | ○ | ⊚ |
| | 47 | Reactive type | 25 | B | b | 10 | — | — | 10 | 1 | ○ | ⊚ |
| | 48 | Reactive type | 25 | C | a | 10 | — | — | 10 | 1 | ○ | ⊚ |
| | 49 | Reactive type | 25 | C | b | 10 | — | — | 10 | 1 | ○ | ⊚ |
| | 50 | Reactive type | 25 | D | a | 10 | — | — | 10 | 1 | ○ | ⊚ |
| | 51 | Reactive type | 25 | D | b | 10 | — | — | 10 | 1 | ○ | ⊚ |
| | 52 | Reactive type | 25 | E | a | 10 | — | — | 10 | 1 | ○ | ⊚ |
| | 53 | Reactive type | 25 | E | b | 10 | — | — | 10 | 1 | ○ | ⊚ |
| | 54 | Reactive type | 25 | A | — | — | aa | 7/3 | 10 | 1 | ⊚ | ⊚ |
| | 55 | Reactive type | 25 | A | — | — | aa | 2/8 | 10 | 1 | ⊚ | ⊚ |
| | 56 | Reactive type | 10 | A | — | — | aa | 7/3 | 10 | 1 | ⊚ | ⊚ |
| | 57 | Reactive type | 200 | A | — | — | aa | 7/3 | 10 | 1 | ⊚ | ⊚ |
| | 58 | Reactive type | 25 | A | — | — | aa | 7/3 | 10 | 1 | ⊚ | ⊚ |
| | 59 | Reactive type | 25 | A | — | — | aa | 8/2 | 10 | 1 | ⊚ | ⊚ |
| | 60 | Reactive type | 25 | A | — | — | bb | 7/3 | 10 | 1 | ⊚ | ⊚ |
| | 61 | Reactive type | 25 | A | — | — | bb | 8/2 | 10 | 1 | ⊚ | ⊚ |
| | 62 | Reactive type | 25 | A | — | — | aa | 8.5/1.5 | 10 | 1 | ⊚ | ⊚ |
| | 63 | Reactive type | 25 | A | — | — | aa | 1.5/8.5 | 10 | 1 | ⊚ | ⊚ |
| | 64 | Reactive type | 25 | A | — | — | aa | 7/3 | 20 | 1 | ⊚ | ⊚ |
| | 65 | Reactive type | 25 | A | — | — | bb | 7/3 | 20 | 1 | ⊚ | ⊚ |
| | 66 | Reactive type | 25 | A | — | — | cc | 7/3 | 10 | 1 | ⊚ | ⊚ |
| | 67 | Reactive type | 25 | A | — | — | dd | 7/3 | 10 | 1 | ⊚ | ⊚ |
| | 68 | Reactive type | 25 | B | — | — | aa | 7/3 | 10 | 1 | ○ | ⊚ |
| | 69 | Reactive type | 25 | B | — | — | bb | 7/3 | 10 | 1 | ○ | ⊚ |
| | 70 | Reactive type | 25 | C | — | — | aa | 7/3 | 10 | 1 | ○ | ⊚ |
| | 71 | Reactive type | 25 | C | — | — | bb | 7/3 | 10 | 1 | ○ | ⊚ |
| | 72 | Reactive type | 25 | D | — | — | aa | 7/3 | 10 | 1 | ○ | ⊚ |
| | 73 | Reactive type | 25 | D | — | — | bb | 7/3 | 10 | 1 | ○ | ⊚ |
| | 74 | Reactive type | 25 | E | — | — | aa | 7/3 | 10 | 1 | ○ | ⊚ |
| | 75 | Reactive type | 25 | E | — | — | bb | 7/3 | 10 | 1 | ○ | ⊚ |

TABLE 6-continued

| | | Paint adhesio (melamine alkyd-series paint) | Paint adhesion (polyester series powder paint) | Paint adhesion (epoxy-series powder paint) | Paint adhesion (acryl-series paint) | Paint adhesion (urethan-series paint) | Ink adhesiveness epoxy series ink) |
|---|---|---|---|---|---|---|---|
| Embodiment | 1 | ◎ | ◎ | ◎ | ◎ | ◎ | ◎ |
| | 2 | ◎ | ◎ | ◎ | ◎ | ◎ | ◎ |
| | 3 | ◎ | ◎ | ◎ | ◎ | ◎ | ◎ |
| | 4 | ◎ | ○ | ◎ | ◎ | ◎ | ◎ |
| | 5 | ◎ | ◎ | ◎ | ◎ | ◎ | ◎ |
| | 6 | ◎ | ◎ | ◎ | ◎ | ◎ | ◎ |
| | 7 | ◎ | ◎ | ◎ | ◎ | ◎ | ◎ |
| | 8 | ◎ | ◎ | ◎ | ◎ | ◎ | ◎ |
| | 9 | ◎ | ◎ | ◎ | ◎ | ◎ | ◎ |
| | 10 | ◎ | ◎ | ◎ | ◎ | ◎ | ◎ |
| | 11 | ○ | ○ | ◎ | ○ | ◎ | ○ |
| | 12 | ○ | ○ | ◎ | ○ | ◎ | ○ |
| | 13 | ◎ | ◎ | ◎ | ◎ | ◎ | ◎ |
| | 14 | ◎ | ◎ | ◎ | ◎ | ◎ | ◎ |
| | 15 | ○ | ○ | ◎ | ○ | ◎ | ○ |
| | 16 | ○ | ○ | ◎ | ○ | ◎ | ○ |
| | 17 | ◎ | ◎ | ◎ | ◎ | ◎ | ◎ |
| | 18 | ○ | ○ | ◎ | ○ | ◎ | ○ |
| | 19 | ○ | ○ | ◎ | ○ | ◎ | ○ |
| | 20 | ◎ | ◎ | ◎ | ◎ | ◎ | ◎ |
| | 21 | ◎ | ◎ | ◎ | ◎ | ◎ | ◎ |
| | 22 | ◎ | ○ | ◎ | ○ | ◎ | ○ |
| | 23 | ○ | ○ | ◎ | ○ | ◎ | ○ |
| | 24 | ○ | ◎ | ◎ | ◎ | ◎ | ◎ |
| | 25 | ◎ | ◎ | ◎ | ◎ | ◎ | ◎ |
| | 26 | ◎ | ◎ | ◎ | ◎ | ◎ | ◎ |
| | 27 | ◎ | ◎ | ◎ | ◎ | ◎ | ◎ |
| | 28 | ◎ | ◎ | ◎ | ◎ | ◎ | ◎ |
| | 29 | ◎ | ◎ | ◎ | ◎ | ◎ | ◎ |
| | 30 | ◎ | ◎ | ◎ | ◎ | ◎ | ◎ |
| | 31 | ◎ | ◎ | ◎ | ◎ | ◎ | ◎ |
| | 32 | ◎ | ◎ | ◎ | ◎ | ◎ | ◎ |
| | 33 | ◎ | ◎ | ◎ | ◎ | ◎ | ◎ |
| | 34 | ◎ | ◎ | ◎ | ◎ | ◎ | ◎ |
| | 35 | ◎ | ◎ | ◎ | ◎ | ◎ | ◎ |
| Comparative Example | 1 | ○ | ○ | ○ | ○ | ○ | ○ |
| | 2 | X | X | Δ | X | Δ | X |
| | 3 | X | X | Δ | X | Δ | X |
| | 4 | ○ | ○ | ○ | ○ | ○ | ○ |
| | 5 | Δ | Δ | Δ | Δ | Δ | Δ |
| | 6 | Δ | Δ | Δ | Δ | Δ | Δ |
| | 7 | ◎ | ○ | ◎ | ○ | ◎ | ○ |
| | 8 | X | X | Δ | X | Δ | X |
| | 9 | X | X | Δ | X | Δ | X |
| | 10 | ○ | ○ | ○ | ○ | ○ | ○ |
| | 11 | Δ | Δ | Δ | Δ | Δ | Δ |
| | 12 | ○ | ○ | ○ | ○ | ○ | ○ |
| | 13 | Δ | Δ | Δ | Δ | Δ | Δ |
| | 14 | Δ | Δ | Δ | Δ | Δ | Δ |
| | 15 | Δ | Δ | Δ | Δ | Δ | Δ |
| | 16 | Δ | Δ | Δ | Δ | Δ | Δ |
| | 17 | ○ | ○ | ○ | ○ | ○ | ○ |
| | 18 | Δ | Δ | Δ | Δ | Δ | Δ |
| | 19 | Δ | Δ | Δ | Δ | Δ | Δ |
| | 20 | Δ | Δ | Δ | Δ | Δ | Δ |
| | 21 | Δ | Δ | Δ | Δ | Δ | Δ |
| | 22 | ○ | ○ | ○ | ○ | ○ | ○ |
| | 23 | ◎ | ○ | ◎ | ○ | ◎ | ○ |
| | 24 | X | X | Δ | X | Δ | X |
| | 25 | X | X | Δ | X | Δ | X |
| | 26 | ○ | ○ | ○ | ○ | ○ | ○ |
| | 27 | Δ | Δ | Δ | Δ | Δ | Δ |
| | 28 | ○ | ○ | ○ | ○ | ○ | ○ |
| | 29 | Δ | Δ | Δ | Δ | Δ | Δ |
| | 30 | Δ | Δ | Δ | Δ | Δ | Δ |
| | 31 | Δ | Δ | Δ | Δ | Δ | Δ |
| | 32 | ◎ | Δ | ◎ | Δ | ◎ | ○ |
| | 33 | ◎ | ○ | ◎ | Δ | ◎ | ○ |
| | 34 | ◎ | Δ | ◎ | Δ | ◎ | ○ |
| | 35 | ◎ | Δ | ◎ | Δ | ◎ | ○ |
| | 36 | ◎ | Δ | ◎ | Δ | ◎ | ○ |
| | 37 | ◎ | Δ | ◎ | Δ | ◎ | ○ |
| | 38 | ◎ | Δ | ◎ | Δ | ◎ | ○ |
| | 39 | ◎ | Δ | ◎ | Δ | ◎ | ○ |

TABLE 6-continued

| | | | | | | |
|---|---|---|---|---|---|---|
| 40 | ○ | Δ | ○ | Δ | ○ | Δ |
| 41 | ○ | ○ | ○ | Δ | ○ | ○ |
| 42 | ⊚ | Δ | ⊚ | Δ | ⊚ | ○ |
| 43 | ⊚ | Δ | ⊚ | Δ | ⊚ | ○ |
| 44 | ○ | Δ | ○ | Δ | ○ | Δ |
| 45 | ○ | Δ | ○ | Δ | ○ | Δ |
| 46 | ⊚ | Δ | ⊚ | Δ | ⊚ | ○ |
| 47 | ⊚ | Δ | ⊚ | Δ | ⊚ | ○ |
| 48 | ⊚ | Δ | ⊚ | Δ | ⊚ | ○ |
| 49 | ⊚ | Δ | ⊚ | Δ | ⊚ | ○ |
| 50 | ⊚ | Δ | ⊚ | Δ | ⊚ | ○ |
| 51 | ⊚ | Δ | ⊚ | Δ | ⊚ | ○ |
| 52 | ⊚ | Δ | ⊚ | Δ | ⊚ | ○ |
| 53 | ⊚ | Δ | ⊚ | Δ | ⊚ | ○ |
| 54 | ⊚ | Δ | ⊚ | Δ | ⊚ | ○ |
| 55 | ⊚ | ○ | ⊚ | Δ | ⊚ | ○ |
| 56 | ⊚ | Δ | ⊚ | Δ | ⊚ | ○ |
| 57 | ⊚ | Δ | ⊚ | Δ | ⊚ | ○ |
| 58 | ⊚ | Δ | ⊚ | Δ | ⊚ | ○ |
| 59 | ⊚ | Δ | ⊚ | Δ | ⊚ | ○ |
| 60 | ⊚ | Δ | ⊚ | Δ | ⊚ | ○ |
| 61 | ⊚ | Δ | ⊚ | Δ | ⊚ | ○ |
| 62 | ○ | Δ | ○ | Δ | ○ | Δ |
| 63 | ○ | ○ | ○ | Δ | ○ | ○ |
| 64 | ⊚ | Δ | ⊚ | Δ | ⊚ | ○ |
| 65 | ⊚ | Δ | ⊚ | Δ | ⊚ | ○ |
| 66 | ⊚ | Δ | ⊚ | Δ | ○ | Δ |
| 67 | ⊚ | Δ | ⊚ | Δ | ○ | Δ |
| 68 | ⊚ | Δ | ⊚ | Δ | ⊚ | ○ |
| 69 | ⊚ | Δ | ⊚ | Δ | ⊚ | ○ |
| 70 | ⊚ | Δ | ⊚ | Δ | ⊚ | ○ |
| 71 | ⊚ | Δ | ⊚ | Δ | ⊚ | ○ |
| 72 | ⊚ | Δ | ⊚ | Δ | ⊚ | ○ |
| 73 | ⊚ | Δ | ⊚ | Δ | ⊚ | ○ |
| 74 | ⊚ | Δ | ⊚ | Δ | ⊚ | ○ |
| 75 | ⊚ | Δ | ⊚ | Δ | ⊚ | ○ |

Ratio*: (Reaction product between an ethylene-base uonomer resin and an epoxty-group containing compound/epoxyemulsion

We claim:

1. A coated steel plate comprising:

a steel plate provided with a plated layer made out of zinc or a zinc-based alloy;

a chromate-treated layer formed on said plated layer with a deposition amount ranging from 1 to 200 g/m$^2$ in terms of metal chromium; and a resin film formed on said chromate-treated layer with a thickness ranging from 0.1 to 5 $\mu$m, wherein said resin film has (A) selected from the group consisting of a reaction product (I) between an ethylene-series ionomer resin and an epoxy-group containing compound which is a di- or poly-glycidyl ether of a polyhydric alcohol; a mixture of an ethylene-series ionomer resin and an epoxy emulsion; a mixture of the reaction product (I) and an epoxy emulsion; and a mixture of the reaction product (I), an ethylene-series ionomer resin and an epoxy emulsion, in an amount of 60–99% by weight; and (B) silica particles in an amount of 1 to 40% by weight dispersed throughout the resin.

2. The coated steel plate according to claim 1, wherein (A) is a reaction product between an ethylene-series ionomer resin and an epoxy-group containing compound which is a di- or poly-glycidyl ether of a polyhydric alcohol.

3. The coated steel plate according to claim 1, wherein (A) is a mixture of an ethylene-series ionomer resin and an epoxy emulsion.

4. The coated steel plate according to claim 1, wherein (A) is a mixture of a reaction product between an ethylene-series ionomer resin and an epoxy group containing compound and an epoxy emulsion.

5. The coated steel plate according to claim 1, wherein said ethylene-series ionomer resin contains methacrylic acid as an unsaturated carboxylic acid.

6. The coated steel plate according to claim 1, wherein said reaction product I consists of 0.1 to 30 parts by weight of an epoxy-group containing compound which is a di- or poly-glycidyl ether of a polyhydric alcohol based on 100 parts by weight of an ethylene-series ionomer resin.

7. The coated steel plate according to claim 1, wherein said epoxy emulsion has an epoxy resin having a molecular weight of 2000 to 5000 as a basic skeleton and wherein said resin film containing said epoxy resin is coated with an acrylic resin.

8. The coated steel plate according to claim 3, wherein a ratio of said ethylene-series ionomer resin to said epoxy emulsion is 1/9 to 9/1 by weight.

9. The coated steel plate according to claim 4, wherein a ratio of said reaction product I to said epoxy emulsion is 1/9 to 9/1 by weight.

10. An organic-composite coated steel plate comprising:

a steel plate provided with a plated layer made of zinc or a zinc-base alloy;

a chromate-treated layer formed on said plated layer of the steel with a deposition amount ranging from 1 to 200 mg/m$^2$ in terms of metal chromium; and a resin film formed on said chromate-treated layer with a thickness ranging from 0.1 to 5 $\mu$m;

wherein the resin film has (A) selected from the group consisting of a reaction product (I) between an ethylene-series ionomer resin and an epoxy-group containing compound which is a di- or poly-glycidyl ether of a polyhydric alcohol;

a mixture of an ethylene-series ionomer resin and an epoxy emulsion; a mixture of the reaction product (I) and an epoxy emulsion; and a mixture of the reaction product (I), an ethylene-series ionomer resin and an epoxy emulsion, in an amount of 40 to 98% by weight;

(B) silica particles in an amount of 1 to 40% by weight dispersed throughout the resin; and (C) an organic lubricant in an amount of 1 to 30% by weight.

11. The organic-composite coated steel plate according to claim 10, wherein (A) is a reaction product between an ethylene-series ionomer resin and an epoxy-group containing compound which is a di- or poly-glycidyl ether of a polyhydric alcohol.

12. The organic-composite coated steel plate according to claim 10, wherein (A) is a mixture of an ethylene-series ionomer resin and an epoxy emulsion.

13. The organic-composite coated steel plate according to claim 10, wherein (A) is a mixture of a reaction product between an ethylene-series ionomer resin and an epoxy-group containing compound, and an epoxy emulsion.

14. The organic-composite coated steel plate according to claim 10, wherein said ethylene-series ionomer resin contains methacrylic acid as an unsaturated carboxylic acid.

15. The organic-composite coated steel plate according to claim 10, wherein said reaction product I consists of 0.1 to 30 parts by weight of an epoxy-group containing compound which is a di- or poly-glycidyl ether of a polyhydric alcohol based on 100 parts by weight of an ethylene-series ionomer resin.

16. The organic-composite coated steel plate according to claim 10, wherein said epoxy emulsion has an epoxy resin having a molecular weight of 2000 to 5000 as a basic skeleton and wherein said resin film containing said epoxy resin is coated with an acrylic resin.

17. The organic-composite coated steel plate according to claim 12, wherein a ratio of said ethylene-series ionomer resin to said epoxy emulsion is 1/9 to 9/1 by weight.

18. The organic-composite coated steel plate according to claim 13, wherein a ratio of said reaction product I to said epoxy emulsion is 1/9 to 9/1 by weight.

* * * * *

UNITED STATES PATENT AND TRADEMARK OFFICE

CERTIFICATE OF CORRECTION

PATENT NO. : 5,846,660
DATED : December 8, 1998
INVENTOR(S) : SASAKI et al

It is certified that error appears in the above-identified patent and that said letters patent is hereby corrected as shown below:

Column 2, line 61, change "200 $g/m^2$" to --200 $mg/m^2$--

Claim 1, line 5, change "200 $g/m^2$" to --200 $mg/m^2$--

Abstract, line 5, change "200 $g/m^2$" to --200 $mg/m^2$--

Signed and Sealed this

Thirtieth Day of November, 1999

*Attest:*

Q. TODD DICKINSON

*Attesting Officer*

*Acting Commissioner of Patents and Trademarks*